(12) United States Patent
Aoki

(10) Patent No.: US 10,698,105 B2
(45) Date of Patent: Jun. 30, 2020

(54) RADAR DEVICE AND PEAK PROCESSING METHOD

(71) Applicant: FUJITSU TEN LIMITED, Kobe-shi, Hyogo (JP)

(72) Inventor: Shinya Aoki, Kobe (JP)

(73) Assignee: FUJITSU TEN Limited, Kobe-shi (JP)

( * ) Notice: Subject to any disclaimer, the term of this patent is extended or adjusted under 35 U.S.C. 154(b) by 338 days.

(21) Appl. No.: 15/608,132

(22) Filed: May 30, 2017

(65) Prior Publication Data

US 2017/0363735 A1    Dec. 21, 2017

(30) Foreign Application Priority Data

Jun. 17, 2016    (JP) .................. 2016-121294

(51) Int. Cl.
| | | |
|---|---|---|
| *G01S 13/931* | (2020.01) | |
| *G01S 13/34* | (2006.01) | |
| *G01S 7/35* | (2006.01) | |
| *G01S 13/08* | (2006.01) | |
| *G01S 13/42* | (2006.01) | |
| *G01S 13/58* | (2006.01) | |

(52) U.S. Cl.
CPC ............. *G01S 13/931* (2013.01); *G01S 7/35* (2013.01); *G01S 7/354* (2013.01); *G01S 13/08* (2013.01); *G01S 13/34* (2013.01); *G01S 13/345* (2013.01); *G01S 13/42* (2013.01); *G01S 13/584* (2013.01); *G01S 2013/932* (2020.01); *G01S 2013/93271* (2020.01)

(58) Field of Classification Search
None
See application file for complete search history.

(56) References Cited

U.S. PATENT DOCUMENTS

2004/0125011 A1*    7/2004    Kumon ................ G01S 13/345
                                                         342/70

FOREIGN PATENT DOCUMENTS

| JP | 2002-202365 A | 7/2002 |
| JP | 2012-103118 A | 5/2012 |
| JP | 2013-205276 A | 10/2013 |
| JP | 2014-112071 A | 6/2014 |
| JP | 2014-115136 A | 6/2014 |
| JP | 2014-115137 A | 6/2014 |
| JP | 2015-155807 A | 8/2015 |

* cited by examiner

*Primary Examiner* — Whitney Moore
(74) *Attorney, Agent, or Firm* — Oliff PLC

(57) ABSTRACT

There is provided a radar device. A signal processing unit is configured to: acquire first and second estimate peaks estimated as a first peak in a rising section and a second peak in a falling section; extract first and second history peaks existing in a predetermined range from the first and second estimate peaks. A determining unit is configured to determine that the signal processing unit has erroneously extracted the first peak corresponding to a still object as the first peak corresponding to a moving object, if an accuracy of pairing of the first history peak and a second object peak existing in a predetermined range apart from the first history peak by a predetermined distance is larger than an accuracy of pairing of the first and second history peaks in a situation where a distance between the radar device and the moving object decreases.

6 Claims, 21 Drawing Sheets

RADAR DEVICE AND PEAK PROCESSING METHOD

CROSS-REFERENCE TO RELATED APPLICATIONS

This application is based on and claims priority from Japanese Patent Application No. 2016-121294 filed on Jun. 17, 2016.

TECHNICAL FIELD

The present invention relates to a radar device and a peak processing method.

RELATED ART

A radar device is configured to transmit a transmission signal, and receive the transmission signal reflected from an object, as a reception signal, thereby detecting a target relating to the object.

An example of such a radar device includes a millimeter wave radar. Also, some radar devices can be mounted on vehicles, and detect targets relating to objects existing around the vehicles by frequency-modulated continuous-waves (FMCWs).

For example, the objects to be detected by the radar devices mounted on the vehicles are classified roughly into still objects and moving objects. Examples of the still objects include traffic lights, poles, pedestrian bridges, telephone poles, road signs, guide rails, and road guide signs installed on roads, side strips, sidewalks, and so on. Also, examples of the moving objects include other vehicles running in front of the vehicle equipped with the radar device in the same direction as the direction of the vehicle equipped with the radar device (hereinafter, such other vehicles will also referred to as preceding vehicles).

Patent Document 1: Japanese Patent Application Publication No. 2013-205276A

The moving objects are substantially on the same plane as that of the vehicle equipped with the radar device; whereas some still objects such as the pedestrian bridges and the road guide signs are installed higher than the vehicle. Hereinafter, the still objects installed higher than the vehicle (equipped with the radar device) will also be referred to as upper objects.

However, some radar devices according to the related art do not calculate angles in the vertical direction between the radar devices and targets. When a preceding vehicle and an upper object overlap in the vertical direction, a radar device which does not calculate angles in the vertical direction may not discriminate between the preceding vehicle and the upper object. For this reason, the radar device may erroneously detect the upper object as the preceding vehicle. In this case, an event in which a tracking object of the radar device erroneously transitions from the preceding vehicle to the upper object occurs. Occurrence of such an event causes malfunction of an advanced emergency braking system (AEBS) mounted on a vehicle. As a result, when the vehicle is close to the upper object, unexpected braking is performed by the AEBS. Especially, when preceding vehicles running at low velocity pass under upper objects, such an event occurs more often.

SUMMARY

It is therefore an object of the present invention to detect that a radar device is erroneously tracking an object unsuitable as a tracking object.

According to an aspect of the embodiments of the present invention, there is provided a radar device configured to: transmit a transmission signal in which a transmission frequency varies in a predetermined cycle; receive the transmission signal reflected from an object, as a reception signal; acquire peaks of frequency spectra of signals representing frequency differences between the transmission frequency and a reception frequency of the reception signal, in a rising section of the transmission frequency and a falling section of the transmission frequency; and output target information regarding the object on the basis of a first peak which is a peak of the rising section and a second peak which is a peak of the falling section, the radar device comprising: a signal processing unit configured to: acquire a first estimate peak which is a peak estimated as the first peak in the rising section; acquire a second estimate peak which is a peak estimated as the second peak in the falling section; extract a peak existing in a predetermined range relative to the first estimate peak in the rising section, as a first history peak, and extract a peak existing in a predetermined range relative to the second estimate peak in the falling section, as a second history peak; and a determining unit configured to determine that the signal processing unit has erroneously extracted the first peak corresponding to a still object as the first peak corresponding to a moving object, if an accuracy of pairing of the first history peak and a second object peak which is the second peak existing in a predetermined range apart from the first history peak by a predetermined distance is larger than an accuracy of pairing of the first history peak and the second history peak in a situation where a distance between the radar device and the moving object decreases.

According to the aspect of the present invention, it is possible to detect that the radar device is erroneously tracking the object unsuitable as the tracking object.

BRIEF DESCRIPTION OF THE DRAWINGS

Exemplary embodiments of the present invention will be described in detailed based on the following figures, wherein.

DETAILED DESCRIPTION

A radar device according to the present invention can transmit a transmission signal in which a transmission frequency varies in a predetermined cycle, and receive the transmission signal reflected from an object, as a reception signal. Subsequently, the radar device according to the present invention can acquire peaks of the frequency spectra of signals representing the frequency differences between the transmission frequency of the transmission signal and the reception frequency of the reception signal (hereinafter, such signals will also be referred to as beat signals and such frequency differences will also be referred to as beat frequencies), in sections in which the transmission frequency increases (hereinafter, such sections will also be referred to as UP sections) and sections in which the transmission frequency decreases (hereinafter, such sections will also be referred to as DOWN sections). Subsequently, the radar device according to the present invention can output information relating to the target (hereinafter, also referred to as target information items), on the basis of the peaks of the UP sections (hereinafter, also referred to as UP peaks) and the peaks of the DOWN sections (hereinafter, also referred to as DOWN peaks). As described above, data items based on association between UP peaks and DOWN peaks are referred to as targets. One target corresponds to one reflecting point of one object.

Hereinafter, embodiments of the radar device and a peak processing method according to the present invention will be described with reference to the accompanying drawings. However, the radar device and the peak processing method according to the present invention are not limited to those embodiments. In the following description, throughout the embodiments, components having the same functions and steps of performing the same processes are denoted by the same reference symbols.

First Embodiment

<Configuration of Vehicle Control System>

Figure 1:
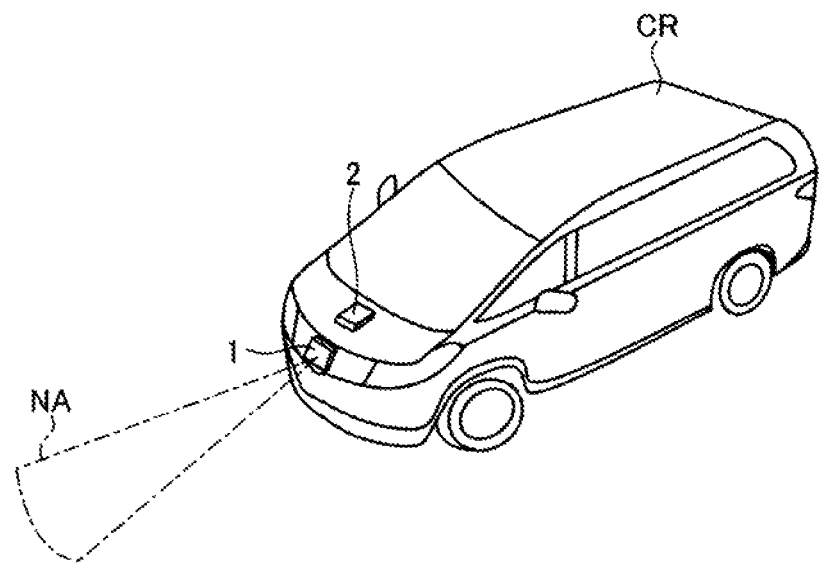
FIG. 1 is a view illustrating an example of a vehicle equipped with a vehicle control system of a first embodiment.
Figure 2:
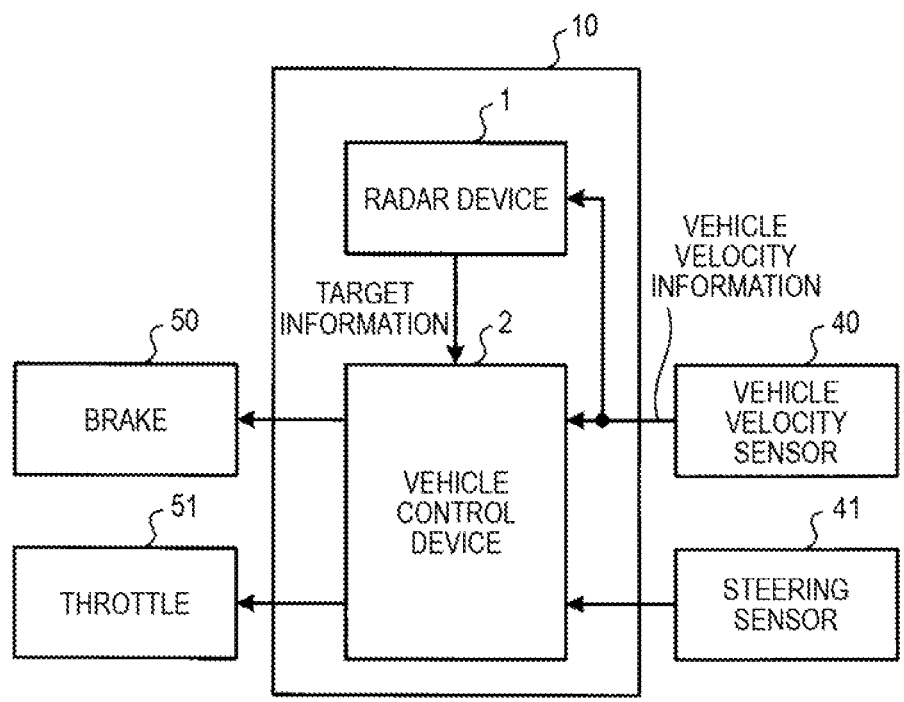
FIG. 2 is a view illustrating a configuration example of the vehicle control system of the first embodiment.

FIG. 1 is a view illustrating an example of a vehicle equipped with a vehicle control system of a first embodiment, and FIG. 2 is a view illustrating a configuration example of the vehicle control system of the first embodiment.

In FIG. 1, a vehicle CR is equipped with a radar device 1 and a vehicle control device 2. The radar device 1 and the vehicle control device 2 are included in a vehicle control system. The vehicle control device 2 may be implemented by an electronic control unit (ECU). The radar device 1 may be mounted on the vehicle CR so as to be close to the front bumper of the vehicle CR. The radar device 1 transmits a transmission signal having, for example, a beam pattern NA, thereby scanning a predetermined scan range, and derives the distances between the vehicle CR and targets in the traverse direction of the vehicle (hereinafter, such distances will also be referred to as longitudinal distances) and the distances between the vehicle CR and the targets in the transverse direction of the vehicle (the vehicle width direction) (hereinafter, such distances will also be referred to as transverse distances), thereby deriving information items on the positions of the targets relative to the vehicle CR. Also, the radar device 1 derives the velocities of the targets (hereinafter, also referred to as relative velocities) relative to the velocity of the vehicle CR (hereinafter, also referred to as the vehicle velocity).

In FIG. 2, a vehicle control system 10 includes the radar device 1 and the vehicle control device 2. The radar device 1 outputs target information items to the vehicle control device 2. Target information items which are output from the radar device 1 include longitudinal distances, transverse distances, and relative velocities.

The vehicle control device 2 is connected to a vehicle velocity sensor 40, a steering sensor 41, a brake 50, and a throttle 51. The vehicle velocity sensor 40, the steering sensor 41, the brake 50, and the throttle 51 are mounted on the vehicle CR.

The vehicle velocity sensor 40 detects the vehicle velocity, and outputs information on the detected vehicle velocity (hereinafter, also referred to as vehicle velocity information) to the radar device 1 and the vehicle control device 2. The steering sensor 41 detects the steering angle of the vehicle CR, and outputs information on the detected steering angle to the vehicle control device 2. The brake 50 decreases the vehicle velocity according to control of the vehicle control device 2. The throttle 51 increases the vehicle velocity according to the control of the vehicle control device 2.

The vehicle control device 2 controls the operation of the brake 50 and the operation of the throttle 51 on the basis of the vehicle velocity detected by the vehicle velocity sensor 40 and the steering angle of the vehicle CR detected by the steering sensor 41, thereby controlling behavior of the vehicle CR. For example, the vehicle control device 2 controls the brake 50 and the throttle 51 on the basis of target information items, the vehicle velocity, and the steering angle of the vehicle CR, thereby implementing adaptive cruise control (ACC) on the vehicle CR such that the vehicle follows a preceding vehicle while keeping a constant distance between the vehicle CR and the preceding vehicle. Also, for example, the vehicle control device 2 controls the brake 50 on the basis of target information items, the vehicle velocity, and the steering angle of the vehicle CR, thereby implementing AEBS for decreasing the vehicle velocity if the vehicle CR is in danger of colliding with an obstacle.

<Configuration of Radar Device>

Figure 3:
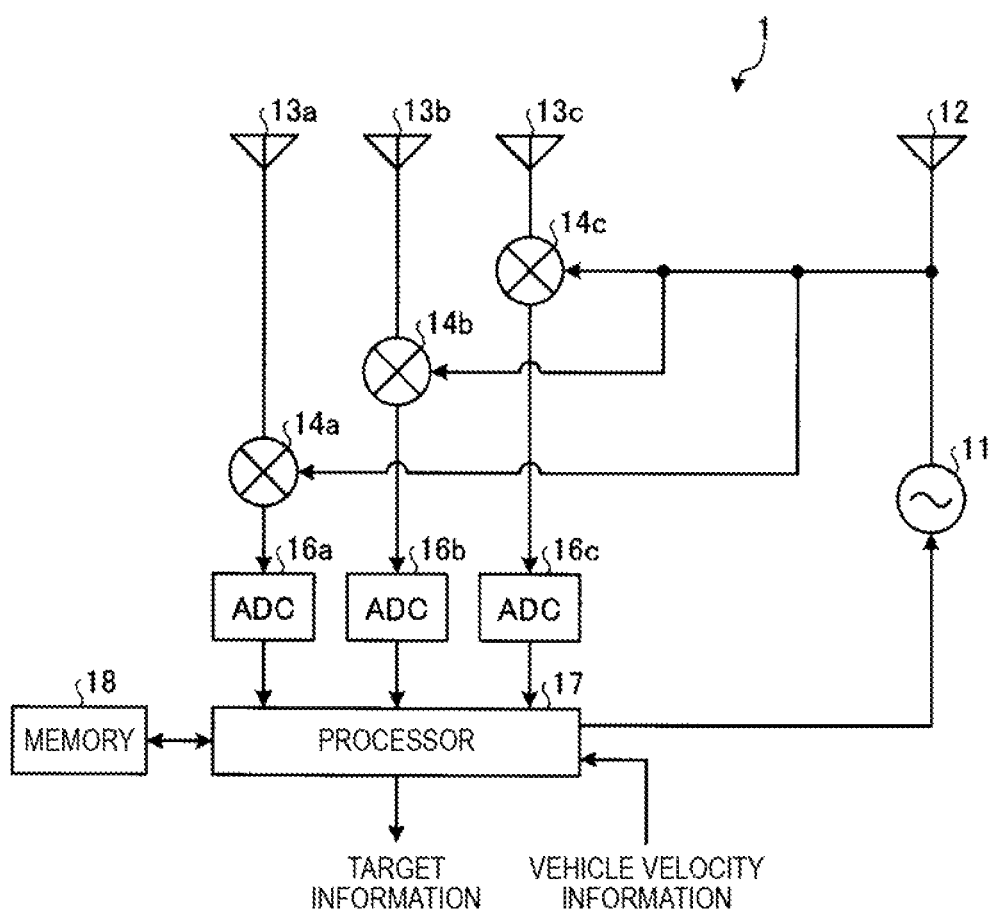
FIG. 3 is a view illustrating a configuration example of a radar device of the first embodiment.

FIG. 3 is a view illustrating a configuration example of the radar device of the first embodiment. In FIG. 3, the radar device 1 includes a processor 17, a memory 18, an oscillator 11, a transmitting antenna 12, receiving antennae 13a, 13b, and 13c, mixers 14a, 14b, and 14c, and analog-to-digital converters (ADCs) 16a, 16b, and 16c. The processor 17 outputs target information items. The receiving antennae 13a, 13b, and 13c are disposed side by side on a straight line at regular intervals, and form an antenna array. Examples of the processor 17 include a central processing unit (CPU), a digital signal processor (DSP), and a field programmable gate array (FPGA). Also, examples of the memory 18 include a RAM such as an SDRAM, a ROM, and a flash memory. Hereinafter, the receiving antennae 13a, 13b, and 13c will also be collectively referred to as the receiving antennae 13, and the mixers 14a, 14b, and 14c will also be collectively referred to as the mixers 14, and the ADCs 16a, 16b, and 16c will also be collectively referred to as the ADCs 16.

The oscillator 11 performs frequency modulation on a continuous-wave signal on the basis of a modulation signal input from the processor 17, thereby generating a transmission signal whose frequency varies as time goes on, and outputs the generated transmission signal to the transmitting antenna 12 and the mixers 14.

The transmitting antenna 12 transmits the transmission signal obtained by frequency modulation of the oscillator 11.

If the transmission signal is reflected from objects, the receiving antennae 13 receive the reflected signals as reception signals.

The mixers 14 mixes the transmission signal input from the oscillator 11 with the reception signals input from the receiving antennae 13. By the mixing of the mixers 14, beat signals representing beat frequencies which are the frequency differences between the transmission frequency of the transmission signal and the reception frequencies of the reception signals are generated. The mixers 14 outputs the beat signals generated by the mixing, to the ADCs 16.

The ADCs 16 convert the analog beat signals into digital beat signals, and outputs the digital beat signals to the processor 17.

<Relation Between Transmission Signals and Reception Signals>

Figure 4:
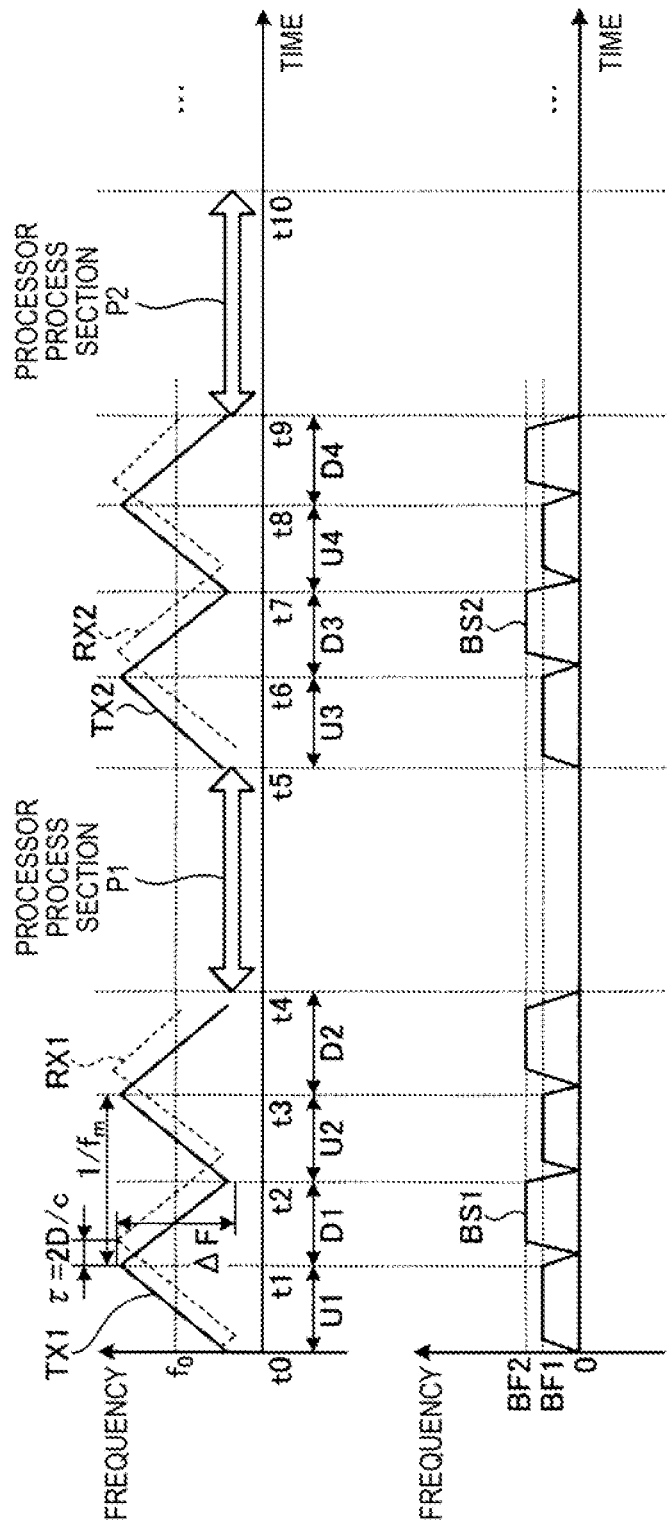
FIG. 4 is a view illustrating an example of the relation between transmission signals and reception signals according to the first embodiment.

FIG. 4 is a view illustrating an example of the relation between transmission signals of the first embodiment and reception signals. The following description will be made taking an FMCW system as an example. However, systems to which the technology of the present invention can be applied are not limited to FMCW systems. The technology of the present invention can be applied to every system for detecting targets on the basis of UP sections in which the transmission frequency of a transmission signal increases and DOWN sections in which the transmission frequency of the transmission signal decreases.

In the following description, fr, fd, f0, ΔF, fm, c, T, fs, R, V, θm, θup, θdn, and D represent distance frequency, velocity frequency, the center frequency of a transmission signal, frequency shift width, modulation signal repetition frequency, the velocity of light (radio-wave velocity), the radio-wave round-trip time between the radar device 1 and a target, the ratio of transmission frequency to reception frequency, longitudinal distance, relative velocity, the angle of a target relative to the radar device 1, an angle corresponding to an UP peak, an angle corresponding to a DOWN peak, and the distance from the radar device 1 to a target, respectively. Also, hereinafter, transmission signals TX1 and TX2 will also be collectively referred to as transmission signals TX, and reception signals RX1 and RX2 will also be collectively referred to as reception signals RX, and beat signals BS1 and BS2 will also be collectively referred to as beat signals BS.

In an upper view of FIG. 4, in a section between a time point t0 and a time point t4, the transmission frequency of the transmission signal TX1 has f0 as the center frequency, and repeatedly increases and decreases in a predetermined cycle "1/fm". Specifically, the transmission frequency of the transmission signal TX1 increases to an upper limit frequency in an UP section U1, and decreases to a lower limit frequency in a DOWN section D1, and increases to the upper limit frequency in an UP section U2, and decreases to the lower limit frequency in a DOWN section D2. For example, the center frequency f0 is 76.5 GHz, and the upper limit frequency is 76.6 GHz, and the lower limit frequency is 76.4 GHz. Whenever performing transmission, the radar device 1 transmits a transmission signal TX corresponding to two periods each of which is a section composed of one UP section and one DOWN section. Also, in a case where the radar device 1 transmits the transmission signal TX1 from the transmitting antenna 12, and receives a reflected signal of the transmission signal from an object as the reception signal RX1 by the receiving antennae 13, similarly to the transmission signal TX1, the reception frequency of the reception signal RX1 also repeatedly increases and decreases in the predetermined cycle "1/fm".

Subsequently, in a processor process section P1, the processor 17 performs signal processing for deriving target information using the transmission signal TX1 and the reception signal RX1.

Subsequently, in a section between a time point t5 and a time point t9, similarly in the section between the time point t0 and the time point t4, the transmission frequency of the transmission signal TX2 has f0 as its center frequency, and repeatedly increases and decreases in the predetermined cycle "1/fm". Specifically, the transmission frequency of the transmission signal TX2 increases to the upper limit frequency in an UP section U3, and decreases to the lower limit frequency in a DOWN section D3, and increases to the upper limit frequency in an UP section U4, and decreases to the lower limit frequency in a DOWN section D4. Also, in a case where the radar device 1 transmits the transmission signal TX2 from the transmitting antenna 12, and receives a reflected signal of the transmission signal from an object as the reception signal RX2 by the receiving antennae 13, similarly to the transmission signal TX2, the reception frequency of the reception signal RX2 also repeatedly increases and decreases in the predetermined cycle "1/fm".

Subsequently, in a processor process section P2 between the time point t9 and a time point t10, the processor 17 performs signal processing for deriving target information using the transmission signal TX2 and the reception signal RX2.

Even after the time point t10, processing identical to that of the section between the time point t0 and the time point t10) is repeated. As described above, the radar device 1 repeatedly performs the sequence of transmission of a transmission signal TX, reception of a reception signal RX, and derivation of target information.

With respect to a transmission signal TX, a reception signal RX has a delay time τ. The delay time τ depends on distance D. Further, in a case where there is a velocity difference between the vehicle velocity and the velocity of an object, a reception signal RX has a frequency difference corresponding to a Doppler shift with respect to a transmission signal TX.

A lower view of FIG. 4 shows beat signals BS. A beat signal BS1 is generated by mixing the transmission signal TX1 and the reception signal RX1, and a beat signal BS2 is generated by mixing the transmission signal TX2 and the reception signal RX2. The beat signals BS represent the frequency differences (i.e. beat frequencies) between the transmission frequency of the transmission signals TX and the reception frequencies of the reception signals RX. For example, the beat frequencies in the UP sections U1, U2, U3, and U4 become BF1, and the beat frequencies in the DOWN sections D1, D2, D3, and D4 becomes BF2. As described above, in individual sections, beat frequencies are derived.

Subsequently, the processor 17 performs fast Fourier transform (FFT) on the beat signals BS input from the ADCs 16, thereby converting the beat signals BS into frequency spectra which are frequency domain data. In other words, in each of the UP sections and the DOWN sections, the frequency spectrum of the beat signal BS is obtained. Hereinafter, the frequency spectra of beat signals BS will also be referred to as FFT data items.

Then, on the basis of the FFT data items derived as described above, the longitudinal distance, relative velocity, and transverse distance of each target relative to the radar device 1 are derived. For example, the distance of each target from the radar device 1 is derived by Expression 1, and the relative velocity of each target relative to the radar device 1 is derived by Expression 2. Also, for example, the angle of each target relative to the radar device 1 is derived by Expression 3. Then, the longitudinal distance and transverse distance of each target relative to the radar device 1 are derived by performing calculations using trigonometric functions on the basis of the distance derived by Expression 1, and the angle derived by Expression 3.

[Expression 1]

$$R = \frac{(f_{up} + f_{dn}) \cdot c}{2 \times (4 \times \Delta F \times f_m)} \quad (1)$$

[Expression 2]

$$V = \frac{(f_{up} - f_{dn}) \cdot c}{2 \times (4 \times \Delta F \times f_m)} \quad (2)$$

[Expression 3]

$$\theta_m = \frac{\theta_{up} + \theta_{dn}}{2} \quad (3)$$

<Functions of Processor>

Figure 5:
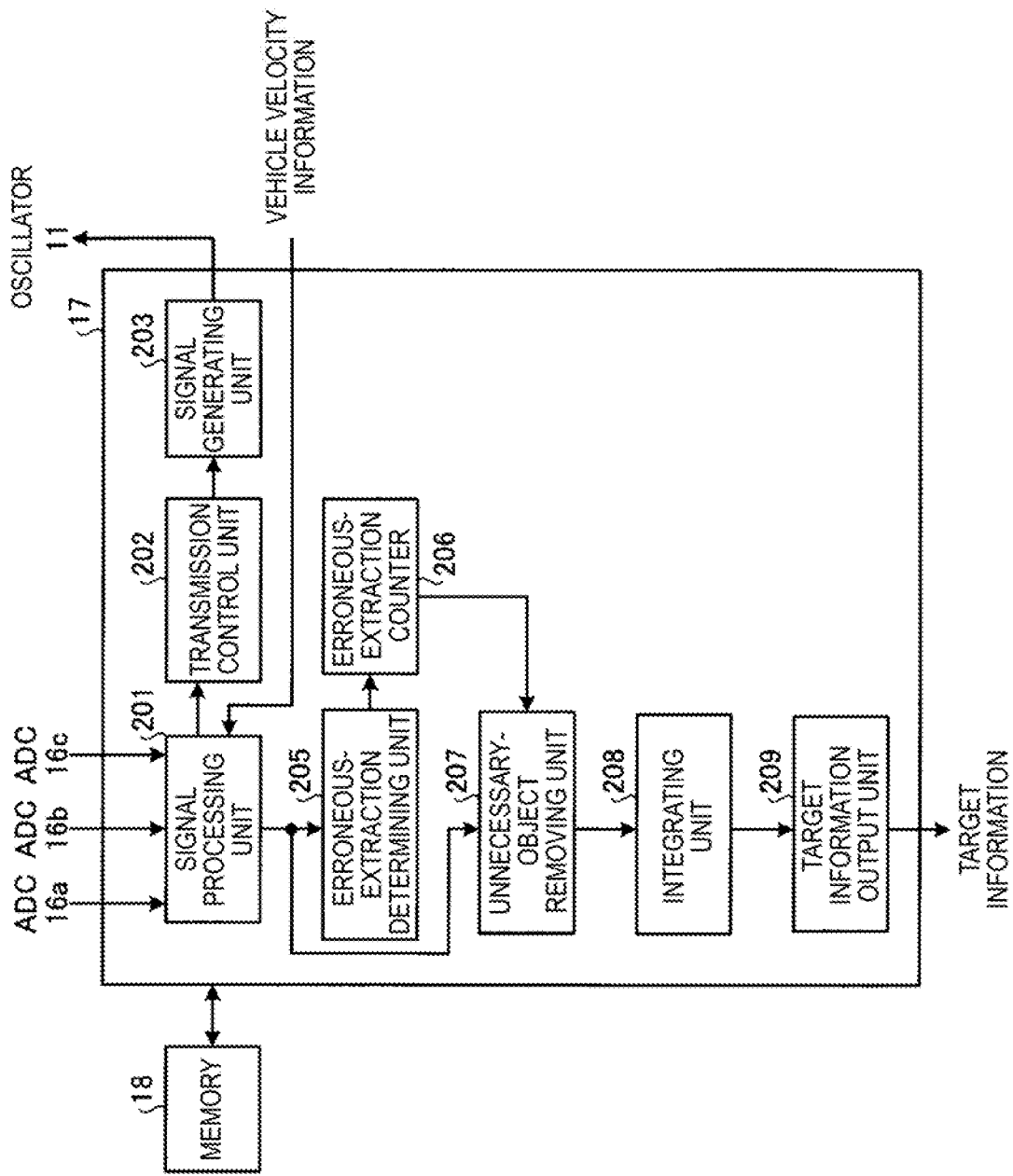
FIG. 5 is a functional block diagram illustrating functions of a processor of the first embodiment.

FIG. 5 is a functional block diagram illustrating functions of the processor of the first embodiment. In FIG. 5, the processor 17 has a signal processing unit 201, a transmission control unit 202, a signal generating unit 203, an erroneous-extraction determining unit 205, an erroneous-extraction counter 206, an unnecessary-object removing unit 207, an integrating unit 208, and a target information output unit 209, as functions of the processor 17.

According to control of the transmission control unit 202, the signal generating unit 203 generates a modulation signal whose voltage varies in a triangular wave form, and outputs the generated modulation signal to the oscillator 11.

The signal processing unit 201 acquires peaks of FFT data items in UP sections and DOWN sections, respectively, and generates target information items on the basis of the UP peaks and the DOWN peaks. At this time, from the FFT data items of the UP sections, the signal processing unit 201 extracts peaks of FFT data items having power exceeding a predetermined threshold, as UP peaks. Also, from the FFT data items of the DOWN sections, signal processing unit extracts peaks of FFT data items having power exceeding a predetermined threshold, as DOWN peaks. The signal processing unit 201 outputs the derived individual information items such as peak information items, information items on pairs of peaks, information items on longitudinal distances, transverse distances, relative velocities, and target information items, to the erroneous-extraction determining unit 205 and the unnecessary-object removing unit 207. This process which is performed by the signal processing unit 201 will be described in detail.

The FFT data items, the target information items, and so on derived by the signal processing unit 201 are stored in the memory 18. For example, FFT data items and target information items derived in a previous process section (for example, the processor process section P1 (FIG. 4)) and a current process section (for example, the processor process section P2 (FIG. 4)) are stored in the memory 18. In other words, a plurality of time-series FFT data items and a plurality of time-series target information items are stored in the memory 18.

The transmission control unit 202 outputs a modulation signal generation instruction to the signal generating unit 203, in response to an instruction from the signal processing unit 201. For example, at the time points t1, t5, and t10 shown in FIG. 4, the signal processing unit 201 instructs the transmission control unit 202 to output the modulation signal generation instruction.

The erroneous-extraction determining unit 205, the erroneous-extraction counter 206, the unnecessary-object removing unit 207, the integrating unit 208, and the target information output unit 209 will be described below.

<Process of Radar Device>

Figure 6:
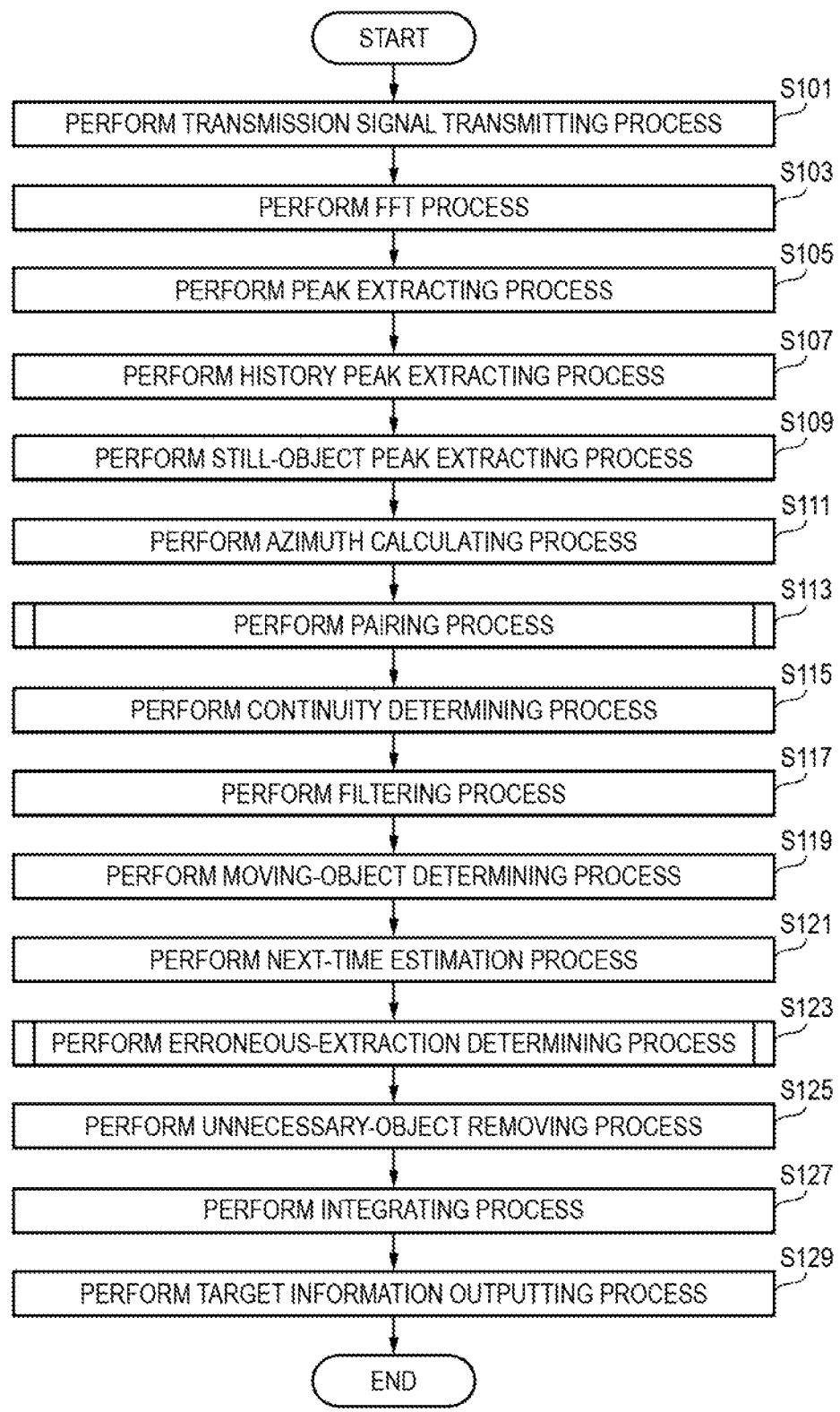
FIG. 6 is a flow chart available for explaining an example of a process of the radar device of the first embodiment.

FIG. 6 is a flow chart available for explaining an example of a process of the radar device of the first embodiment. In the flow chart of FIG. 6, the process of STEP S101 is performed from the time point t1 to the time point t4 and from the time point t5 to the time point t9 (FIG. 4), and the processes of STEPS S103 to S129 are performed in the processor process section P1 (from the time point t4 to the time point t5) and the processor process section P2 (from the time point t9 to the time point t10). Also, with respect to each of the processes of STEPS S103 to S129 of the flow chart of FIG. 6, if a previous process is performed in the processor process section P1, a current process is performed in the processor process section P2.

First, in STEP S101, if a transmission signal TX transmitted from the transmitting antenna 12 is reflected from objects and the reflected signals reach the radar device 1, the reflected signals are received as reception signals RX by the receiving antennae 13. The transmission signal TX and the reception signals RX are mixed by the mixers 14, whereby analog beat signals BS are generated. The analog beat signals BS are converted into digital beat signals BS by the ADCs 16, and the digital beat signals BS are input to the signal processing unit 201.

Subsequently, in STEP S103, the signal processing unit 201 performs FFT on the beat signals BS input from the ADCs 16, thereby acquiring FFT data items of UP sections and DOWN sections, respectively.

Subsequently, in STEP S105, the signal processing unit 201 performs a peak extracting process, thereby acquiring peaks from the FFT data items of the UP sections and the DOWN sections, respectively. In the peak extracting process, from the FFT data items of the UP sections, the signal processing unit 201 extracts peaks of FFT data items having power exceeding the predetermined threshold, as UP peaks. Also, from the FFT data items of the DOWN sections, the signal processing unit extracts peaks of FFT data items having power exceeding the predetermined threshold, as DOWN peaks.

Subsequently, in STEP S107, from the peaks extracted by the current peak extracting process (STEP S105), the signal processing unit 201 performs a history peak extracting process of extracting peaks (hereinafter, also be referred to as history peaks) having temporal continuity with peaks acquired with respect to targets in the past.

In other words, in STEP S107, the signal processing unit 201 extracts peaks existing in predetermined frequency ranges set with reference to the frequencies of peak estimate values (hereinafter, also referred to as estimate peaks) derived by performing a next-time estimation process (STEP S121) in the previous process section of the processor 17, as history peaks of the UP sections and the DOWN sections, respectively. Hereinafter, UP peak estimate values will also be referred to as estimate UP peaks, and DOWN estimate peak values will also be referred to as estimate DOWN peaks. Also, hereinafter, history peaks of UP sections will also be referred to as history UP peaks, and history peaks of DOWN sections will also be referred to as history DOWN peaks. Hereinafter, the process of STEP S107 will be described in more detail.

Figure 7:
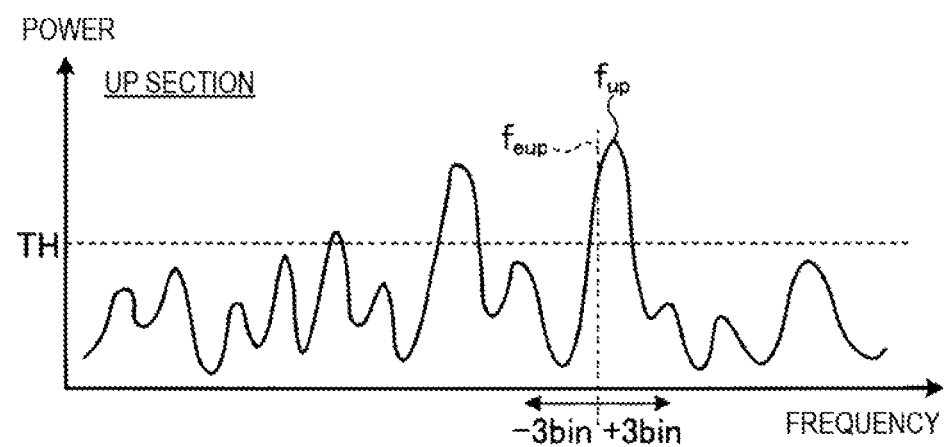
FIG. 7 is a view available for explaining an operation example of a signal processing unit of the first embodiment.
Figure 8:
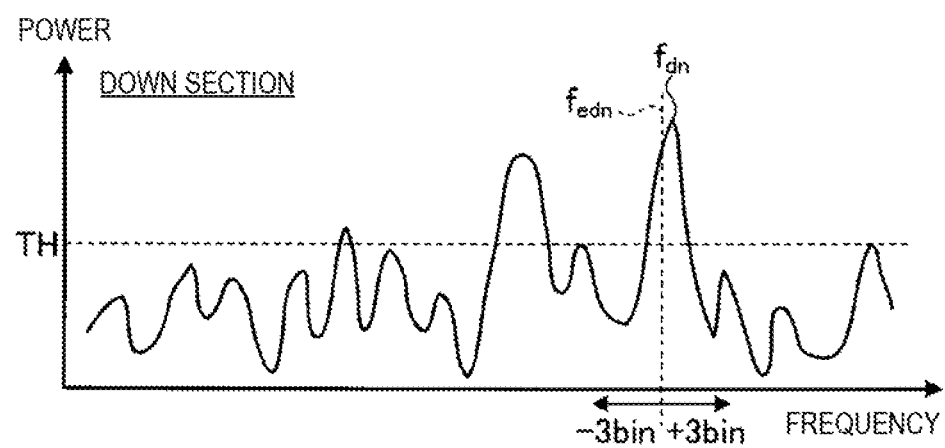
FIG. 8 is a view available for explaining the operation example of the signal processing unit of the first embodiment.

FIGS. 7 and 8 are views available for explaining an operation example of the signal processing unit of the first embodiment. FIG. 7 shows an UP peak of an FFT data item, and FIG. 8 shows a DOWN peak of an FFT data item. In FIG. 7, the signal processing unit 201 searches a range of six bins having the frequency feup of an estimate UP peak as its center, for history UP peaks. In the case shown in FIG. 7, since an UP peak fup having power equal to or higher than a threshold TH exists in the range of six bins having the frequency feup as the center, the signal processing unit 201 extracts the UP peak fup as a history UP peak. One bin is, for example, about 468 Hz.

Similarly, in FIG. 8, the signal processing unit 201 searches a range of six bines having the frequency fedn of an estimate DOWN peak, for history DOWN peaks. In the case shown in FIG. 8, since a DOWN peak fdn having power equal to or higher than the threshold TH exists in the range of six bins having the frequency fedn as the center, the signal processing unit 201 extracts the DOWN peak fdn as a history DOWN peak.

Also, in a case where a plurality of peaks having power equal to or higher than the threshold TH exists in a range of six bins having the frequency of an estimate peak as its center, the signal processing unit 201 extracts a peak existing at a frequency closest to the frequency of the estimate peak, as a history peak.

Subsequently, in STEP S109, on the basis of the vehicle velocity information input from the vehicle velocity sensor 40, the signal processing unit 201 extracts peaks of sections in which the frequency differences between the UP sections and the DOWN sections correspond to the vehicle velocity, as peaks corresponding to still objects (hereinafter, also referred to as still-object peaks). Here, still objects are objects having almost the same relative velocity as the vehicle velocity, and moving objects are objects having relative velocities different from the vehicle velocity.

Also, as described above, the history peak extracting process (STEP S107) and the still-object peak extracting process (STEP S109) are performed in order to select peaks corresponding to targets which the radar device 1 needs to preferentially notify to the vehicle control device 2. For example, among the targets corresponding to the peaks extracted by the current peak extracting process (STEP S105), targets corresponding to peaks having temporal continuity with peaks of targets extracted in the previous peak extracting process are more likely to exist, as compared to targets corresponding to peaks newly extracted by the current peak extracting process. For this reason, peaks having temporal continuity may have priorities higher than those of newly extracted peaks. Also, for example, since moving objects are more likely than still objects to collide with the vehicle CR, peaks corresponding to moving objects may have priorities higher than those of peaks corresponding to still objects.

Subsequently, in STEP S111, the signal processing unit 201 calculates the azimuths of the targets of the UP sections and the DOWN sections, on the basis of the extracted peaks, respectively. For example, the signal processing unit 201 derives the azimuths (angles) of the targets by a predetermined azimuth calculating algorithm such as ESPRIT (Estimation of Signal Parameters via Rotational Invariance Techniques). In a case where ESPRIT can be used, the signal processing unit 201 calculates the eigenvalues, eigenvectors, and so on of correlation matrixes from the phase information items of the reception signals RX of the receiving antennae 13, and derives angles θup corresponding to the UP peaks and angles θdn corresponding to the DOWN peaks. Subsequently, the signal processing unit 201 derives the angles of the targets from the angles θup and the angles θdn by Expression 3. However, a plurality of target information items may be included in one peak. For example, peaks of a plurality of target information items having the same distance value and different angle values as information items on the positions of targets relative to the radar device 1 may exist at the same frequency. In this case, since the phases of a plurality of reception signals RX input from different angles are different from each other, on the basis of the phases of the reception signals RX, the signal processing unit 201 calculates a plurality of angles corresponding to the plurality of targets with respect to one peak.

Subsequently, in STEP S113, the signal processing unit 201 performs a pairing process of pairing the UP peaks and the DOWN peaks. With respect to the history peaks extracted by the history peak extracting process of STEP S107 from all peaks extracted by the peak extracting process of STEP S105, this pairing process is performed between the history UP peaks and the history DOWN peaks. With respect to the still-object peaks extracted by the still-object peak extracting process of STEP S109 from all peaks extracted by the peak extracting process of STEP S105, the pairing process is performed between the still-object peaks of the UP sections (hereinafter, also referred to as the still-object UP peaks) and the still-object peaks of the DOWN sections (hereinafter, also referred to as the still-object DOWN peaks). Further, with respect to the other peaks (hereinafter, also referred to as the remaining peaks) of all peaks extracted by the peak extracting process of STEP S105 except for the history peaks and the still-object peaks, the pairing process is performed between the remaining peaks of the UP sections (hereinafter, also referred to as the remaining UP peaks) and the remaining peaks of the DOWN sections (hereinafter, also referred to as the remaining DOWN peaks).

Also, the pairing process between the UP peaks and the DOWN peaks is performed by calculation using, for example, Mahalanobis distances. For example, before the radar device 1 is mounted on the vehicle CR, pairing of UP peaks and DOWN peaks is experimentally performed a plurality of times. Then, a plurality of correct pairs obtained by the plurality of pairing processes and a plurality of incorrect pairs obtained by the plurality of pairing processes are acquired as normal pairs and erroneous pairs, respectively. Therefore, with respect to each of the plurality of normal pairs, the values of three parameters, i.e., the frequency spectrum power difference, angle difference, and angle spectrum power difference between an UP peak and a DOWN peak are obtained, and with respect to each of the three parameters, the average value of the plurality of normal pairs is derived, and is stored in the memory 18 in advance.

Then, after the radar device 1 is mounted on the vehicle CR, when the processor 17 derives target information items, the signal processing unit 201 derives Mahalanobis distances DM(x) by Expression 4 using the values of the three parameters of every combination of the UP peaks and the DOWN peaks and the average value of the plurality of normal pairs relative to each of the three parameters. Further, the signal processing unit 201 derives a pair having the minimum Mahalanobis distance DM(x) in the current process, as a normal pair. Here, a Mahalanobis distance DM(x) corresponds to a group of values expressed by a multivariable vector x=(x1, x2, x3) whose average μ is (μ1, μ2, μ3)T and whose covariance matrix is Σ, and is derived by Expression 4. Also, the elements μ1, μ2, and μ3 represent the values of the three parameters of the normal pair, and the elements x1, x2, and x3 represent the values of three parameters of the pair of the current process.

[Expression 4]

$$D_M(x) = \sqrt{(x-\mu)^T \Sigma^{-1} (x-\mu)} \quad (4)$$

Thereafter, in the pairing process, the signal processing unit 201 derives the longitudinal distance, relative velocity, and transverse distance of each normal pair, using the parameter values of the normal pairs and Expressions 1 to 3. Meanwhile, a pairing process using history peaks will be described below.

Subsequently, in STEP S115, the signal processing unit 201 determines whether each pair obtained by the current pairing process (STEP S113) (hereinafter, such a pair will also be referred to as a current pair) has temporal continuity with any pair obtained by the previous pairing process (STEP S113) (hereinafter, such a pair will also be referred to as a previous pair). Here, a case where a current pair and a previous pair have temporal continuity means, for example, a case where all of the longitudinal distance difference, transverse distance difference, and relative velocity difference between a current pair estimated on the basis of the previous pair (hereinafter, such a pair will also be referred to as an estimate pair) and the current pair actually acquired are equal to or smaller than predetermined values. In this case, it is determined that the target detected by the current process and the target detected by the previous process are the same target. Meanwhile, in a case where there is a plurality of current pairs having longitudinal distance differences, transverse distance differences, and relative velocity differences equal to or smaller than the predetermined values with respect to an estimate pair, among the plurality of current pairs, the signal processing unit 201 determines a current pair closest to the estimate pair, as a pair having temporal continuity with the previous pair.

Meanwhile, in a case where any one of the longitudinal distance difference, transverse distance difference, and relative velocity difference between the estimate pair and the actually acquired current pair is larger than the predetermined value, the signal processing unit 201 determines that the current pair and the previous pair do not have temporal continuity. Further, a current pair determined as having no temporal continuity with any previous pair is determined as a pair derived for the first time in the current process (hereinafter, such data items will also be referred to as a new pair).

Subsequently, in STEP S117, in the case where the current pair and the previous pair have temporal continuity, the signal processing unit 201 performs filtering on the current pair and the previous pair with respect to the longitudinal distances, the relative velocities, the transverse distances, and the power values, thereby deriving filtered pair data items (hereinafter, also referred to as filter data items), and outputs the derived filter data items to the erroneous-extraction determining unit 205 and the unnecessary-object removing unit 207.

For example, in the case where a current pair and a previous pair have temporal continuity, with respect to the transverse distances, the signal processing unit 201 assigns 0.75 and 0.25 as weights to the transverse distance of the estimate pair and the transverse distance of the current pair, respectively, and derives the sum of the weighted transverse distances as the transverse distance of the filter data items of the current process. Even with respect to the longitudinal distances, the relative velocities, and the power values, the signal processing unit 201 performs filtering similar to that on the transverse distances.

Subsequently, in STEP S119, on the basis of the velocity of the vehicle CR and the relative-velocity information items of the filter data items, the signal processing unit 201 determines filter data items corresponding to moving objects. By performing the process of STEP S117, it is possible to determine filter data items which need to be preferentially processed.

Subsequently, in STEP S121, the signal processing unit 201 derives estimate values (such as estimates of longitudinal distances, estimates of relative velocities, and estimates of transverse distances) to be used in the next history peak extracting process (STEP S107). For example, the signal processing unit 201 specifies a predetermined number of filter data items having high priorities for controlling the vehicle CR, and calculates estimate peaks of UP peaks and DOWN peaks corresponding to the specified filter data items, and performs a history peak extracting process (STEP S107) using the calculated estimate peaks in the next process section of the processor 17. As for priorities of filter data items, in ACC, filter data items having transverse positions corresponding to a lane where the vehicle CR is running (hereinafter, also referred to as the lane of the vehicle CR) and being at relatively short longitudinal distances from the vehicle CR have high priorities, and filter data items having transverse positions corresponding to lanes adjacent to the lane of the vehicle CR and being at relatively long transverse distances from the vehicle CR have low priorities.

For example, the signal processing unit 201 performs the reverse process of the process of pairing UP peaks and DOWN peaks, thereby dividing the filter data items into UP peaks and DOWN peaks. Then, the signal processing unit 201 derives estimate UP peaks using the frequency information items and angle information items of the UP peaks, and derives estimate DOWN peaks using the frequency information items and angle information items of the DOWN peaks.

Subsequently, in STEP S123, the erroneous-extraction determining unit 205 performs an erroneous-extraction determining process of determining whether any still-object peak was erroneously extracted as a peak corresponding to a moving object (hereinafter, also referred to as a moving-object peak) in the history peak extracting process (STEP S107) and the still-object peak extracting process (STEP S109) performed by the signal processing unit 201. Hereinafter, moving-object peaks of UP sections will also be referred to as moving-object UP peaks, and moving-object peaks of DOWN sections will also be referred to as moving-object DOWN peaks. Details of processes which are performed in the erroneous-extraction determining process will be described below.

Subsequently, in STEP S125, from filter data items derived in the past and current processes, the unnecessary-object removing unit 207 removes filter data items unnecessary to be output as target information items to the vehicle control device 2. For example, if some peaks are determined in the erroneous-extraction determining process of STEP S123 as having been erroneously extracted, the unnecessary-object removing unit 207 removes filter data items corresponding to those peaks, from the filter data items derived in the past and current processes. Also, for example, from the filter data items derived in the past and current processes, the unnecessary-object removing unit 207 removes filter data items corresponding to still objects existing at positions higher than the height of the vehicle CR by a predetermined distance (for example, cantilever type road guide signs, gate type road guide sign, and so on installed over roads). Also, for example, from the filter data items derived in the past and current processes, the unnecessary-object removing unit 207 removes filter data items corresponding to still objects existing at positions lower than the bottom of the vehicle CR (for example, median strips on roads, road studs installed on curved roads, and so on). Also, for example, from the filter data items derived in the past and current processes, the unnecessary-object removing unit 207 removes filter data items corresponding to ghost peaks caused by interference (intermodulation) between peaks corresponding to targets actually existing at positions apart from the radar device 1 by a predetermined distance or more and switching noise generated by a DC to DC converter of a power supply unit of the radar device 1. Therefore, the filter data items corresponding to the peaks determined as erroneously extracted peaks by the erroneous-extraction determining process of STEP S123, and the filter data items corresponding to still objects existing at positions higher than the height of the vehicle CR by the predetermined distance, still objects existing at positions lower than the bottom of the vehicle CR, and ghost peaks are not output as target information items to the vehicle control device 2.

Subsequently, in STEP S127, the integrating unit 208 performs an integrating process of integrating a plurality of filter data items corresponding to one object into one. For example, in a case where the radar device 1 receives a plurality of signals reflected from a plurality of reflecting points of the same object, as reception signals, the integrating unit 208 derives a plurality of filter data items having position information items different from each other, on the basis of the reception signals, respectively. However, since the plurality of derived filter data items is filter data items originally corresponding to one object, the integrating unit 208 integrates the plurality of filter data items into one, such that the plurality of filter data items corresponding to the same object is treated as one filter data item. Therefore, for example, if a plurality of filter data items has almost the same relative velocity and has longitudinal distances and transverse distances in predetermined ranges, the integrating unit 208 considers the plurality of filter data items as filter data items relative to the same object, and integrates the plurality of filter data items into one filter data item corresponding to one object. The integrating process will also be referred to as a grouping process or grouping.

Subsequently, in STEP S129, the target information output unit 209 selects a predetermined number of data groups from the data groups obtained by the integrating process of STEP S127, and outputs the selected data groups as target information items to the vehicle control device 2.

<Pairing Process>

Figure 9:
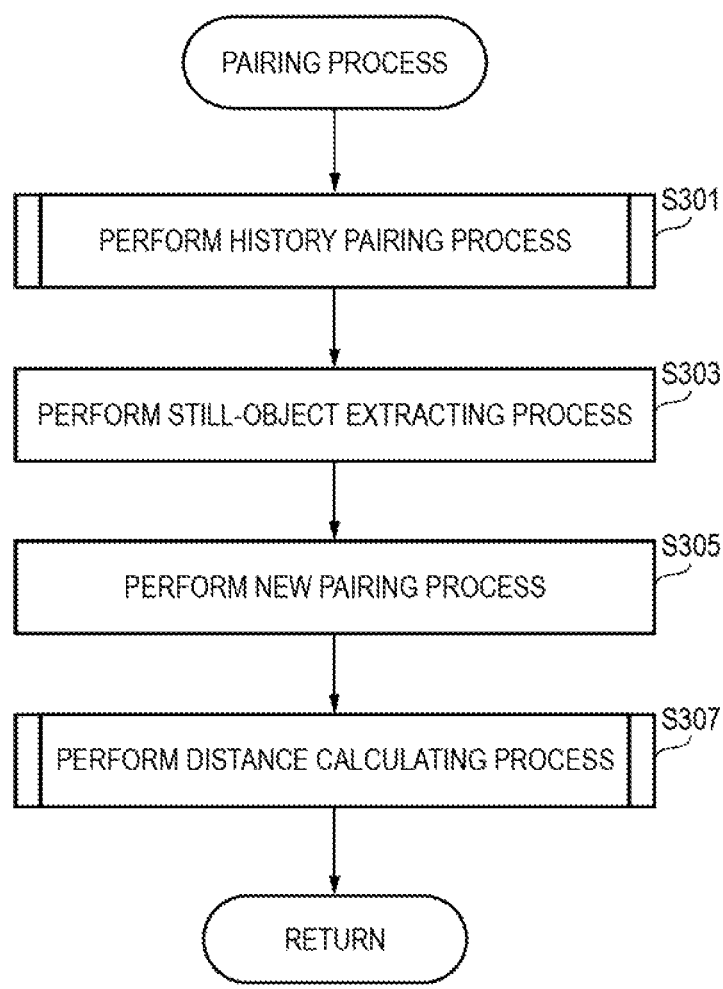
FIG. 9 is a flow chart available for explaining an example of a pairing process of the first embodiment.

FIG. 9 is a flow chart available for explaining an example of the pairing process of the first embodiment. The series of steps of the pairing process shown in FIG. 9 corresponds to the process of STEP S113 shown in FIG. 6.

In FIG. 9, first, in STEP S301, the signal processing unit 201 derives history pairs by pairing the history UP peaks and the history DOWN peaks extracted by the history peak extracting process of STEP S107.

Now, the history pairing process of STEP S301 will be described in more detail. FIG. is a flow chart available for explaining an example of the history pairing process of the first embodiment.

Figure 10:
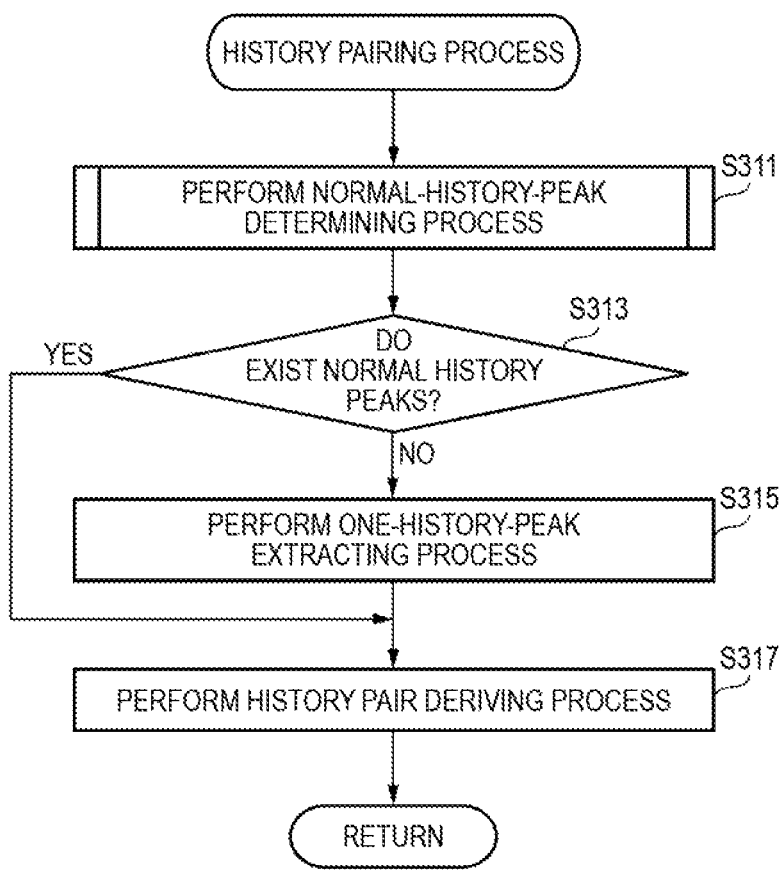
FIG. 10 is a flow chart available for explaining an example of a history pairing process of the first embodiment.

In FIG. 10, in STEP S311, the signal processing unit 201 performs a normal-history-peak determining process of extracting history UP peaks and history DOWN peaks corresponding to the estimate UP peaks and the estimate DOWN peaks, respectively, from history peaks included in a predetermined frequency range.

Figure 11:
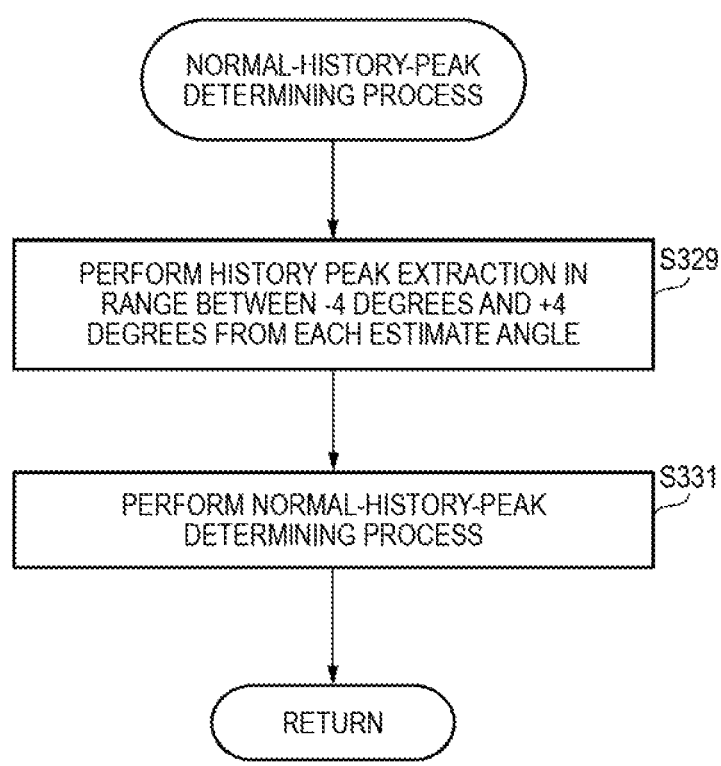
FIG. 11 is a flow chart available for explaining an example of a normal-history-peak determining process of the first embodiment.

FIG. 11 is a flow chart available for explaining the normal-history-peak determining process of the first embodiment.

In FIG. 11, in STEP S329, the signal processing unit 201 calculates the differences between angles derived from the history peaks and angles derived from the estimate peaks (hereinafter, also referred to as estimate angles), and extracts history peaks having angle differences of 4 degrees or less, from the history peaks extracted by STEP S107. For example, the signal processing unit 201 derives the angles, by performing a process similar to the above-described azimuth calculation, using the history UP peaks extracted by STEP S107. Then, the signal processing unit 201 compares the derived angles with the estimate angles derived from the estimate angles derived from the estimate UP peaks, and extracts history UP peaks having angle differences in a range between −4 degrees and +4 degrees (hereinafter, such history UP peaks will also be referred to as normal history UP peaks) with respect to corresponding estimate angles. Also, even with respect to the history DOWN peaks, similarly to the process on the history UP peaks, the signal processing unit 201 compares the angles derived from the history DOWN peaks with the estimate angles derived from the estimate DOWN peaks, and extracts history DOWN peaks having angle differences in a range between −4 degrees and +4 degrees (hereinafter, such history DOWN peaks will also be referred to as normal history DOWN peaks) with respect to corresponding estimate angles. Hereinafter, normal history UP peaks and normal history DOWN peaks will also be collectively referred to as normal history peaks. Hereinafter, the process of STEP S329 will be described in more detail.

Figure 12:
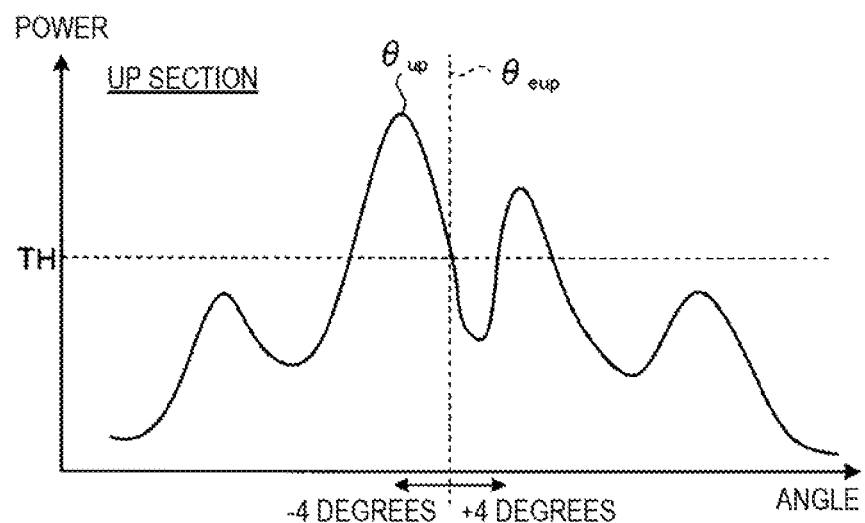
FIG. 12 is a view available for explaining another operation example of the signal processing unit of the first embodiment.
Figure 13:
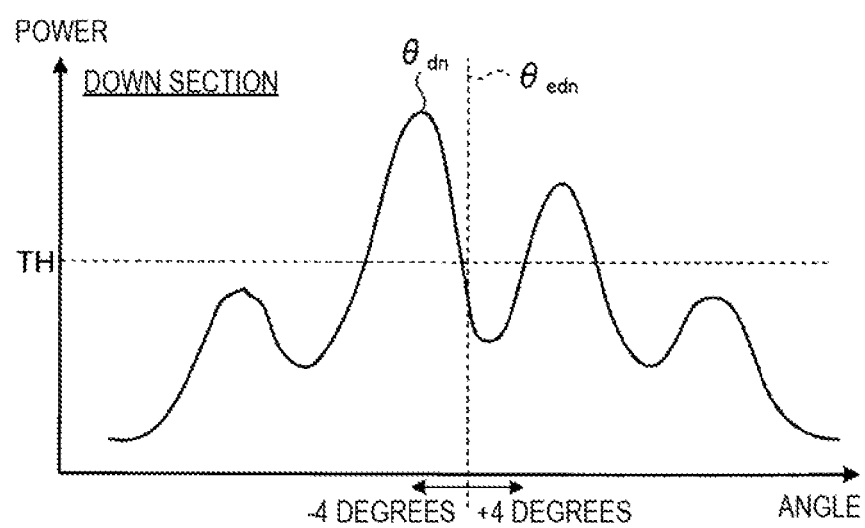
FIG. 13 is a view available for explaining the operation example of the signal processing unit of the first embodiment shown in FIG. 12.

FIGS. 12 and 13 are views available for explaining an operation example of the signal processing unit of the first embodiment. The signal processing unit 201 derives angles θup by azimuth calculation based on history UP peaks fup extracted by the process of STEP S107. FIG. 12 shows an angle spectrum derived from a history UP peak fup. In FIG. 12, the signal processing unit 201 determines whether any angle θup having power equal to or larger than a threshold TH is included in a range between −4 degrees and +4 degrees from an estimate angle θeup. In a case where an angle θup having power equal to or larger than the threshold TH is included in the range between −4 degrees and +4 degrees from the estimate angle θeup, the signal processing unit 201 determines the history UP peak fup as a normal history UP peak.

Similarly, the signal processing unit 201 derives angles θdn by azimuth calculation based on history DOWN peaks fdn extracted by the process of STEP S107. FIG. 13 shows an angle spectrum derived from a history DOWN peaks fdn. In FIG. 13, the signal processing unit 201 determines whether any angle θdn having power equal to or larger than a threshold TH is included in a range between −4 degrees and +4 degrees from an estimate angle θedn derived from an estimate DOWN peak. In a case where an angle θdn having power equal to or larger than the threshold TH is included in the range between −4 degrees and +4 degrees from the estimate angle θedn, the signal processing unit 201 determines the history DOWN peak fdn as a normal history DOWN peak.

Meanwhile, in a case where a plurality of angles θup having power equal to or larger than the threshold TH exists in the range between −4 degrees and +4 degrees with respect to the estimate angle θeup, the signal processing unit 201 determines a history UP peak corresponding to an angle θup closest to the estimate angle θeup, as a normal history UP peak. Similarly, in a case where a plurality of angles θdn having power equal to or larger than the threshold TH exists in the range between −4 degrees and +4 degrees with respect to the estimate angle θedn, the signal processing unit 201 determines a history DOWN peak corresponding to an angle θdn closest to the estimate angle θedn, as a normal history DOWN peak.

Referring to FIG. 11 again, in STEP S331, the signal processing unit 201 performs a normal-history-peak determining process of determining whether there are both of a normal history UP peak and a normal history DOWN, peak, with respect to each estimate pair. For example, in a case where there are both of a normal history UP peak and a normal history DOWN peak satisfying the condition of STEP S329, the signal processing unit 201 determines that normal history peaks exist. In contrast, in a case where there is either a normal history UP peak or a normal history DOWN peak satisfying the conditions of STEPS S327 and S329, or there is no normal history peak satisfying the conditions, the signal processing unit 201 determines that normal history peaks do not exist.

Referring to FIG. 10 again, in a case where the signal processing unit 201 determines that normal history peaks exist, in the determination of STEP S331 ("Yes" in STEP S313), in STEP S317, the signal processing unit 201 derives a history pair by pairing the normal history UP peak and the normal history DOWN peak.

Meanwhile, in a case where the signal processing unit 201 determines that normal history peaks do not exist, in the determination of STEP S331 ("No" in STEP S313), the process proceeds to a one-side-history-peak extracting process of STEP S315.

In the present embodiment, in the normal-history-peak determining process of STEP S311, the signal processing unit 201 determines whether both of a normal history UP peak and a normal history DOWN peak exist. Therefore, in a case where the signal processing unit 201 determines that there is either a normal history UP peak or a normal history DOWN peak, in STEP S331, it determines that normal history peaks do not exist, but holds the determination result representing that there is either a normal history UP peak or a normal history DOWN peak. Therefore, in the one-side-history-peak extracting process of STEP S315, from the result of the normal-history-peak determining process of STEP S311, the signal processing unit 201 extracts either the normal history UP peak or the normal history DOWN peak. Further, in STEP S315, in the case where there is either a normal history UP peak or a normal history DOWN peak, the signal processing unit 201 determines that there is a one-side history peak, and sets a one-side history pair flag to an ON state; whereas in a case where there is no peak, the signal processing unit determines that there is no one-side history peak, and sets the one-side history pair flag to an OFF state.

In a case where the signal processing unit 201 determines that there is a one-side history in STEP S315, the signal processing unit 201 derives a history pair, for example, by pairing either the normal history UP peak or the normal history DOWN peak with the estimate DOWN peak or the estimate UP peak of the opposite section to that of the existing normal history peak.

Referring to FIG. 9 again, after the signal processing unit 201 performs the history pairing process of STEP S301, in STEP S303, it performs a pairing process on the still-object peaks extracted by the still-object peak extracting process of STEP S109. In STEP S303, the signal processing unit 201 pairs the still-object UP peaks and the still-object DOWN peaks. The signal processing unit 201 performs pairing of the still-object UP peaks and the still-object DOWN peaks, in the same way as the pairing of the history UP peaks and the history DOWN peaks. Hereinafter, pairs of still-object UP peaks and still-object DOWN peaks will also be referred to as still-object pairs, and pairs of moving-object UP peaks and moving-object DOWN peaks will also be referred to as moving-object pairs.

Subsequently, in STEP S305, the signal processing unit 201 pairs the remaining UP peaks and the remaining DOWN peaks. The signal processing unit 201 performs pairing of the remaining UP peaks and the remaining DOWN peaks in the same way as the pairing of the history UP peaks and the history DOWN peaks. Pairs of the remaining UP peaks and the remaining DOWN peaks correspond to new pairs described above.

Figure 14:
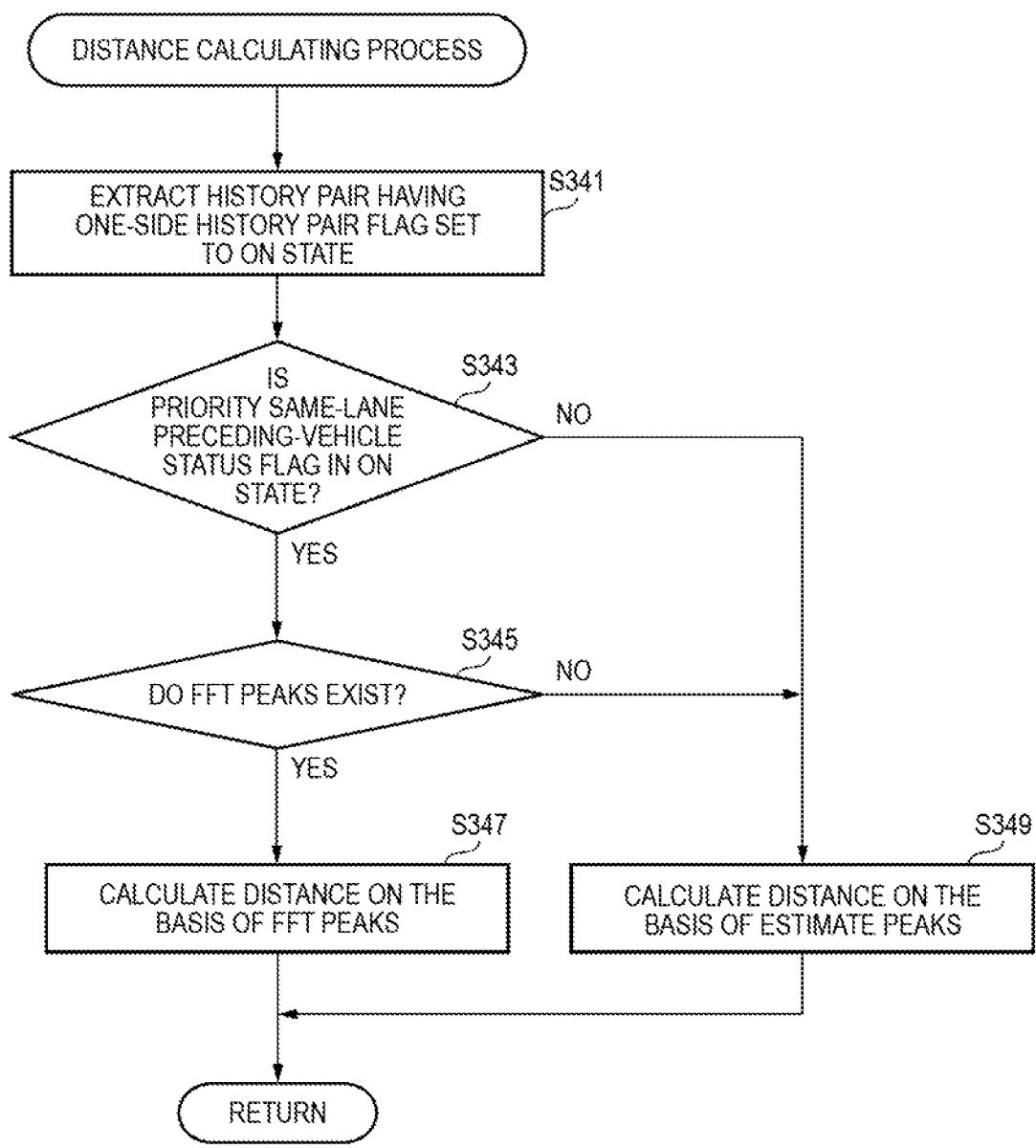
FIG. 14 is a flow chart available for explaining an example of a distance calculating process of the first embodiment.

Subsequently, in STEP S307, the signal processing unit 201 calculates longitudinal distances, relative velocities, angles, transverse distances, and the like on the basis of the pairs derived by the above-described individual pairing processes. When calculating longitudinal distances, relative velocities, angles, transverse distances, and the like on the basis of the still-object pairs derived by the still-object extracting process of STEP S303 or the new pairs derived by the new pairing process of STEP S305, the signal processing unit 201 can calculate them in the same way as that in the case of using Expressions 1 to 3. Hereinafter, calculation based on the history pairs derived by the history pairing process of STEP S301 will be described. FIG. 14 is a flow chart available for explaining an example of a distance calculating process of the first embodiment.

In FIG. 14, in STEP S341, the signal processing unit 201 extracts a history pair having one-side history pair flag set to the ON state. Since one peak of two peaks included in a history pair having a one-side history pair flag set to the ON state is either a normal history UP peak or a normal history DOWN peak, the other peak is either a history DOWN peak or a history UP peak, or is either an estimate DOWN peak or an estimate UP peak.

Subsequently, in STEP S343, the signal processing unit 201 determines whether a priority same-lane preceding-vehicle status flag of the history pair extracted by STEP S341 is in an ON state. If the priority same-lane preceding-vehicle status flag of the history pair is in the ON state ("Yes" in STEP S343), the process proceeds to STEP S345; whereas if the priority same-lane preceding-vehicle status flag of the history pair is in an OFF state ("No" in STEP S343), the process proceeds to STEP S349.

In STEP S345, the signal processing unit 201 determines whether there are FFT data item peaks (hereinafter, also referred to as FFT peaks) corresponding to the peaks of the history pair having the priority same-lane preceding-vehicle status flag set in the ON state. In a case where there are FFT peaks corresponding to the peaks of the history pair ("Yes" in STEP S345), the process proceeds to STEP S347. Meanwhile, in a case where FFT peaks corresponding to the peaks of the history pair do not exist ("No" in STEP S345), the process proceeds to STEP S349.

In STEP S347, the signal processing unit 201 calculates a distance and the like on the basis of the FFT peaks. For example, in a case where the history pair is composed of a normal history UP peak and a history DOWN peak, the signal processing unit 201 calculates a distance, a relative velocity, and so on using the FFT peak of the normal history UP peak and the FFT peak of the history DOWN peak. Also, since the history DOWN peak has no angle information item, the signal processing unit 201 derives the angle of the normal history UP peak, as the angle of the history pair.

In STEP S347, the distance and the like can be calculated by Expressions 1 to 3. In other words, the signal processing unit 201 uses the frequency of the FFT peak of the normal history UP peak and the frequency of the FFT peak of the history DOWN peak as fup and fdn in Expressions 1 and 2, respectively. Also, the signal processing unit 201 uses the angle derived from the normal history UP peak as θup in Expression 3, but does not use θdn in Expression 3.

Meanwhile, in STEP S349, since one of the two peaks included in the history pair is an estimate peak, the signal processing unit 201 calculates a distance and the like on the basis of estimate peaks. For example, in a case where the history pair is composed of a normal history UP peak and an estimate DOWN peak, the signal processing unit 201 calculates a distance and a relative velocity using the FFT peak of the normal history UP peak and an estimate peak. Also, the signal processing unit 201 can also derive an estimate angle from the estimate DOWN peak; however, it is also possible to derive the angle of the normal history UP peak as the angle of the history pair.

In STEP S349, the distance and the like can be calculated by Expressions 1 to 3. In other words, the signal processing unit 201 uses the frequency of the FFT peak of the normal history UP peak and the frequency of the FFT peak of the estimate DOWN peak as fup and fdn in Expressions 1 and 2, respectively. Also, the signal processing unit 201 uses the angle derived from the normal history UP peak as θup in Expression 3, but does not use θdn in Expression 3.

Although the case where there is a one-side history peak has been described above, for example, in a case where there are neither normal history peaks nor a one-side history peak, estimate peaks of the UP section and the DOWN section may be used to calculate the distance, the relative velocity, and the angle.

<Operation of Erroneous-Extraction Determining Unit>

FIGS. 15 to 21 are views available for explaining an operation example of the erroneous-extraction determining unit of the first embodiment. The following description will made using a preceding vehicle and an upper object as an example of a moving object and an example of a still object, respectively; however, moving objects to which the technology of the present invention can be applied are not limited to preceding vehicles, and still objects to which the technology of the present invention can be applied are not limited to upper objects. Also, the following description will made using an AEBS as an example of vehicle control; however vehicle control to which the technology of the present invention can be applied is not limited to AEBSs.

Figure 15:
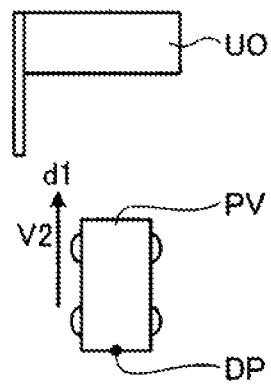
FIG. 15 is a view available for explaining an operation example of an erroneous-extraction determining unit of the first embodiment.
Figure 15:
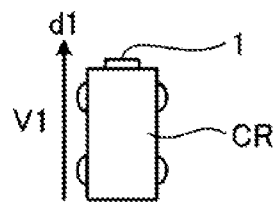

In FIG. 15, the vehicle CR equipped with the radar device 1 (hereinafter, referred to simply as the vehicle CR) is running in a direction d1 at a velocity V1. Meanwhile, a preceding vehicle PV which is a moving object is running in the direction d1 at a velocity V2 lower than the velocity V1. In short, in FIG. 15, the vehicle CR and the preceding vehicle PV are running toward an upper object UO. At a time point shown in FIG. 15, the relative velocity Vcrpv1 of the preceding vehicle PV relative to the vehicle CR is V2−V1. Also, the relative velocity Vcruo of the upper object UO relative to the vehicle CR is −V1. The upper object UO is, for example, a road guide sign. At the time point shown in FIG. 15, the radar device 1 sets an object detection point DP of an AEBS on the preceding vehicle PV.

Figure 16:
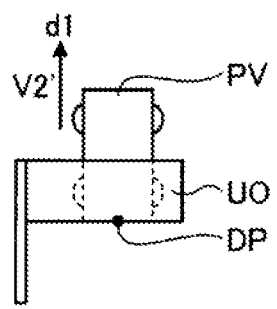
FIG. 16 is a view available for explaining the operation example of the erroneous-extraction determining unit of the first embodiment.
Figure 16:
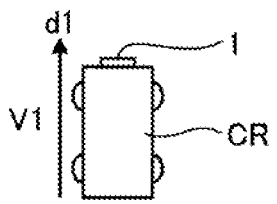

In FIG. 16 showing a time point after the time point shown in FIG. 15, since the preceding vehicle PV decelerates from the velocity V2 to a velocity V2'; whereas the vehicle CR maintains the velocity V1, the distance between the radar device 1 and the preceding vehicle PV decreases. Therefore, at the time point shown in FIG. 16, the relative velocity Vcrpv2 of the preceding vehicle PV relative to the vehicle CR becomes V2'−V1, whereas the relative velocity Vcruo of the upper object UO relative to the vehicle CR is maintained at −V1. Also, the velocity V2' is a very low velocity. Therefore, at the time point shown in FIG. 16, the velocity difference between the relative velocity Vcrpv2 of the preceding vehicle PV relative to the vehicle CR and the relative velocity Vcruo of the upper object UO relative to the vehicle CR becomes smaller than a threshold. Also, in FIG. 16, since the preceding vehicle PV is passing under the upper object UO, the preceding vehicle PV and the upper object UO overlap in the vertical direction. Therefore, at the time point shown in FIG. 16, the object detection point DP of the AEBS of the radar device 1 transitions from the preceding vehicle PV to the upper object UO.

Figure 17:
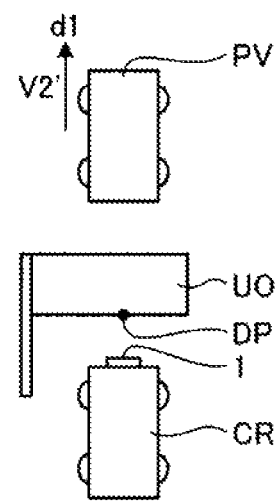
FIG. 17 is a view available for explaining the operation example of the erroneous-extraction determining unit of the first embodiment.

Therefore, as shown in FIG. 17 illustrating a time point after the time point shown in FIG. 16, after the preceding vehicle PV has passed under the upper object UO, the object detection point DP of the AEBS of the radar device 1 is set to the upper object UO. If the detection point DP is set to the upper object UO, the upper object UO as a target of the AEBS is erroneously detected by the radar device 1. As a result, when the vehicle CR reaches a predetermined distance from the upper object UO, since the AEBS erroneously recognizes that the vehicle CR has reached the predetermined distance from the preceding vehicle PV, the AEBS erroneously performs unnecessary braking right in front of the upper object UO.

In a case where the situation transitions in the order of FIGS. 15, 16, and 17, peak transitions occurs as shown in FIGS. 18 to 21. Also, in each of FIGS. 18 to 21, the signal processing unit 201 acquires an estimate UP peak and an estimate DOWN peak, and extracts a peak existing in a predetermined range relative to the estimate UP peak, as a normal history UP peak, and extracts a peak in the predetermined range relative to the estimate DOWN peak, as a normal history DOWN peak. The predetermined ranges are, for example, frequency ranges of six bins having the frequency of the estimate UP peak or the estimate DOWN peak as its center, or angle ranges of 8 degrees having the angle of the estimate UP peak or the estimate DOWN peak as its center. In FIGS. 18 to 21, peaks shown by solid lines are normal history peaks.

Figure 18:
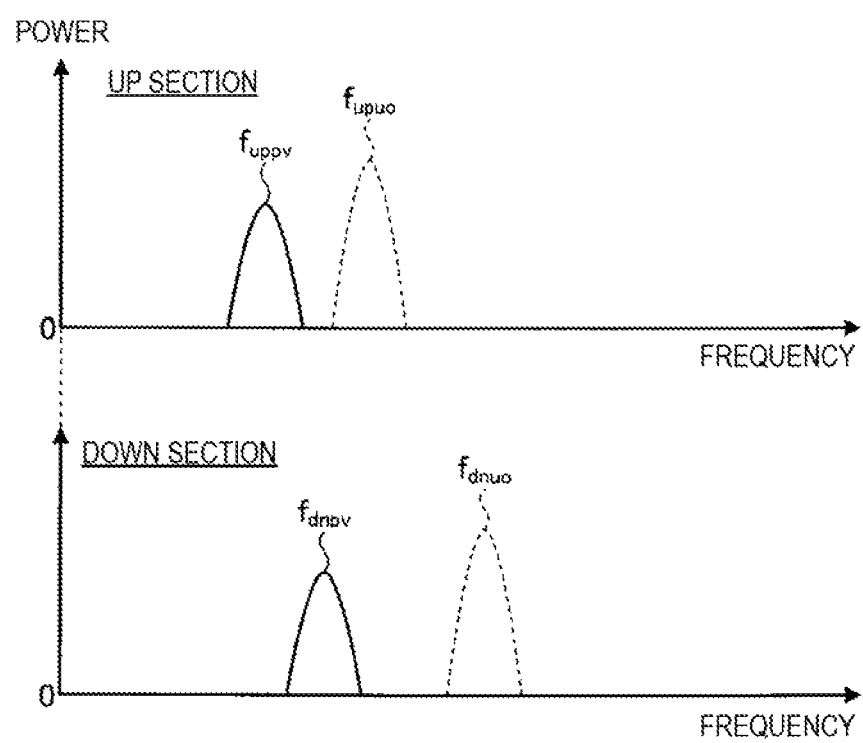
FIG. 18 is a view available for explaining the operation example of the erroneous-extraction determining unit of the first embodiment.

A peak state shown in FIG. 18 corresponds to the situation shown in FIG. 15, and in the situation of FIG. 15, peaks are in the state of FIG. 18. Specifically, in the situation show in FIG. 15, in each UP section, as shown in the upper part of FIG. 18, there are an UP peak fuppv corresponding to the preceding vehicle PV (hereinafter, such an UP peak will also be referred to as a preceding vehicle UP peak), an UP peak fupuo corresponding to the upper object UO (hereinafter, such an UP peak will also be referred to as an upper object UP peak). Also, in a DOWN section, as shown in the lower part of FIG. 18, there are a DOWN peak fdnpv corresponding to the preceding vehicle PV (hereinafter, such a DOWN peak will also be referred to as a preceding vehicle DOWN peak), and a DOWN peak fdnuo corresponding to the upper object UO (hereinafter, such a DOWN peak will also be referred to as an upper object DOWN peak). Hereinafter, preceding vehicle UP peaks and preceding vehicle DOWN peaks will also be collectively referred to as preceding vehicle peaks, and upper object UP peaks and upper object DOWN peaks will also be collectively referred to as upper object peaks. Also, in this situation, the power of the upper object UP peak fupuo is higher than the power of the preceding vehicle UP peak fuppv, and the power of the upper object DOWN peak fdnuo is higher than the power of the preceding vehicle DOWN peak fdnpv. Also, since the velocity V2 of the preceding vehicle PV is lower than the velocity V1 of the vehicle CR, the relative velocity Vcrpv1 of the preceding vehicle PV relative to the vehicle CR becomes a negative value. Further, since the upper object UO is a still object, the relative velocity Vcruo of the upper object UO relative to the vehicle CR also becomes a negative value. Therefore, on the frequency axis, the preceding vehicle UP peak fuppv exists at a position closer to the origin (zero) than the preceding vehicle DOWN peak fdnpv does, and the upper object UP peak fupuo exists at a position closer to the origin (zero) than the upper object DOWN peak fdnuo. Also, in FIG. 18, sine the preceding vehicle UP peak fuppv and the preceding vehicle DOWN peak fdnpv are normal history peaks, the object detection point DP of the AEBS of the radar device 1 is set to the preceding vehicle PV as shown in FIG. 15.

Figure 19:
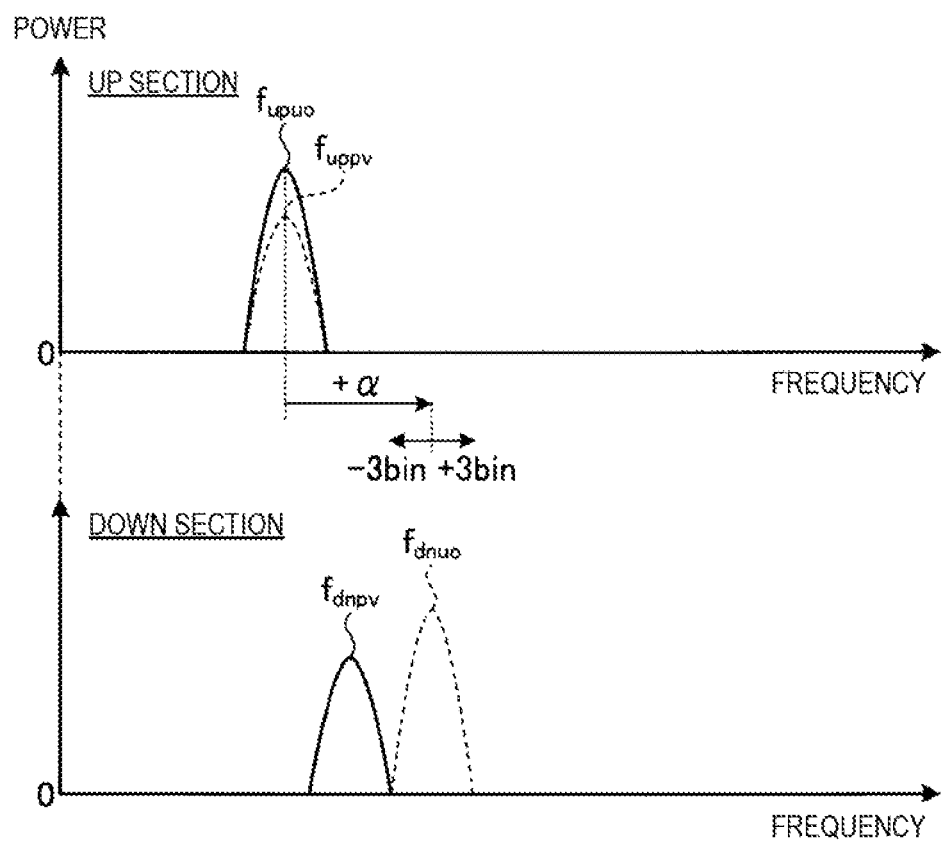
FIG. 19 is a view available for explaining the operation example of the erroneous-extraction determining unit of the first embodiment.
Figure 20:
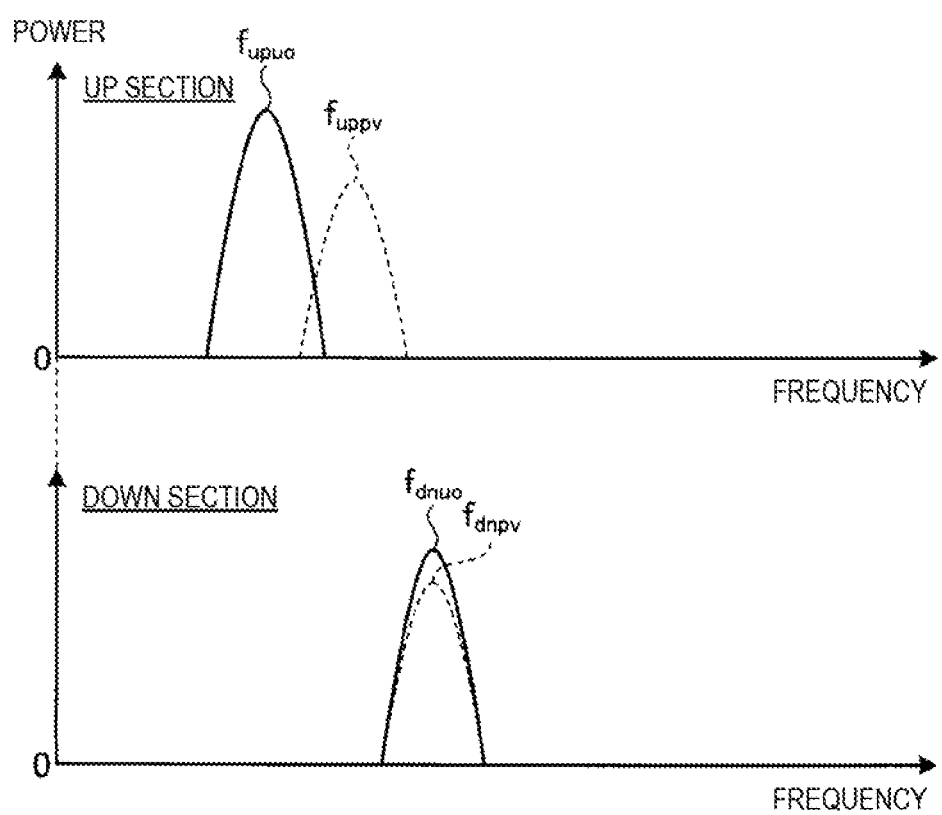
FIG. 20 is a view available for explaining the operation example of the erroneous-extraction determining unit of the first embodiment.

Subsequently, peak states shown in FIGS. 19 and 20 corresponds to a situation shown in FIG. 16, in the situation of FIG. 16, peaks are in the states of FIGS. 19 and 20. FIGS. 19 and 20 are states after the state shown in FIG. 18 in terms of time.

Specifically, in the situation shown in FIG. 16, in UP sections, first, the upper object UP peak fupuo shifts toward the preceding vehicle UP peak fuppv in the negative direction on the frequency axis. As a result, as shown in the upper part of FIG. 19, the preceding vehicle UP peak fuppv and the upper object UP peak fupuo having power higher than that of the preceding vehicle UP peak fuppv are positioned at frequency positions which are almost the same as each other, thereby overlapping. Therefore, the preceding vehicle UP peak fuppv is buried in the upper object UP peak fupuo. Therefore, first, the normal history UP peak transitions from the preceding vehicle UP peak fuppv to the upper object UP peak fupuo. Also, in the situation shown in FIG. 16, in DOWN sections, first, as shown in the lower part of FIG. 19, the upper object DOWN peak fdnuo shifts toward the preceding vehicle DOWN peak fdnpv in the negative direction on the frequency axis.

Subsequently, in the situation shown in FIG. 16, in UP sections, as shown in the upper part of FIG. 20, the upper object UP peak fupuo which is the normal history UP peak further shifts in the negative direction on the frequency axis, that is, it shifts away from the preceding vehicle UP peak fuppv. Also, in the situation of FIG. 16, in DOWN sections, the upper object DOWN peak fdnuo further shifts in the negative direction on the frequency axis. As a result, as shown in the lower part of FIG. 20, the preceding vehicle DOWN peak fdnpv and the upper object DOWN peak fdnuo having power higher than that of the preceding vehicle DOWN peak fdnpv are positioned at frequency positions which are almost the same as each other, thereby overlapping. Therefore, the preceding vehicle DOWN peak fdnpv is buried in the upper object DOWN peak fdnuo. Therefore, the normal history DOWN peak transitions from the preceding vehicle DOWN peak fdnpv to the upper object DOWN peak fdnuo.

If the normal history UP peak transitions from the preceding vehicle UP peak fuppv to the upper object UP peak fupuo at a time point shown in FIG. 19, and the normal history DOWN peak transitions from the preceding vehicle DOWN peak fdnpv to the upper object DOWN peak fdnuo at a time point shown in FIG. 20, as shown in FIG. 16, the object detection point DP of the AEBS of the radar device 1 transitions from the preceding vehicle PV to the upper object UO.

Subsequently, a peak state shown in FIG. 21 corresponds to the situation shown in FIG. 17, and in the situation shown in FIG. 17, peaks are in the state show in FIG. 21. Specifically, in the situation shown in FIG. 17, in UP sections, as shown in the upper part of FIG. 21, the upper object UP peak fupuo which is the normal history UP peak further shifts in the negative direction on the frequency axis, that is, it shifts far away from the preceding vehicle UP peak fuppv. Also, in the situation shown in FIG. 17, in DOWN sections, as shown in the lower part of FIG. 21, the upper object DOWN peak fdnuo which is the normal history DOWN peak further shifts in the negative direction on the frequency axis, that is, it shifts far away from the preceding vehicle DOWN peak fdnpv.

It can be seen from FIGS. 18 to 21 that in the case where the normal history peaks transition from the preceding vehicle UP peak fuppv and the preceding vehicle DOWN peak fdnpv to the upper object UP peak fupuo and the upper object DOWN peak fdnuo, the positional relation and transitions of the preceding vehicle UP peak fuppv, the preceding vehicle DOWN peak fdnpv, the upper object UP peak fupuo, and the upper object DOWN peak fdnuo satisfy the following first to third conditions.

<First Condition>

The first condition is a condition in which, as shown in FIG. 18, on the frequency axis, the preceding vehicle UP peak fuppv should be closer to the origin (zero) than the origin than the preceding vehicle DOWN peak fdnpv does, and the upper object UP peak fupuo should be closer to the origin (zero) than the upper object DOWN peak fdnuo does. This first condition corresponds to a state where the relative velocity Vcrpv1 of the preceding vehicle PV relative to the vehicle CR is a negative value. In short, a situation satisfying the first condition is a situation where the distance between the radar device 1 mounted on the vehicle CR and the preceding vehicle PV decreases. In other words, the first condition is a condition based on whether a peak exists close to the origin on the frequency axis.

<Second Condition>

The second condition is a condition in which a DOWN peak should exist in a predetermined range (for example, a range of six bins) having, as its center, a position apart from the normal history UP peak by a predetermined distance $+\alpha$ on the frequency axis. The magnitude of the absolute value of the predetermined distance a is proportional to the magnitude of the absolute value of the relative velocity of the upper object UO relative to the vehicle CR, that is, the magnitude of the absolute value of the velocity of the vehicle CR. In other words, the second condition is a condition based on whether a peak exists in a predetermined range having, as its center, a position apart from the normal history peak by the predetermined distance on the frequency axis.

In FIG. 19, the upper object DOWN peak fdnuo which is a DOWN peak exists in a range of six bins having, as its center, a position apart from the upper object UP peak fupuo which is the normal history UP peak by the predetermined distance $+\alpha$. Therefore, the peak state shown in FIG. 19 satisfies the second condition.

Hereinafter, a DOWN peak existing in a range having a predetermined width and having, as its center, a position apart from a normal history UP peak on the frequency axis by the predetermined distance $+\alpha$ will also be referred to as an object DOWN peak. Also, in a case where a plurality of DOWN peaks exists in a range having the predetermined width and having, as its center, a position apart from a normal history UP peak on the frequency axis by the predetermined distance $+\alpha$, the erroneous-extraction determining unit 205 determines a DOWN peak having the highest power, as an object DOWN peak.

<Third Condition>

The third condition is a condition in which the Mahalanobis distance of a pair of a normal history UP peak and an object DOWN peak (hereinafter, such a distance will also be referred to as a first Mahalanobis distance) should be smaller than the Mahalanobis distance of a pair of the normal history UP peak and a normal history DOWN peak (hereinafter, such a distance will also be referred to as a second Mahalanobis distance). In other words, the third condition is a condition based on the Mahalanobis distances of pairs of peaks. The erroneous-extraction determining unit 205 sets three parameter values (i.e., the frequency beat signal power difference, angle difference, and angle spectrum power difference) of the pair of the normal history UP peak and the object DOWN peak as x1, x2, and x3, and classifies a first Mahalanobis distance by Expression 4. Also, the erroneous-extraction determining unit 205 sets three parameter values of a pair of the normal history UP peak and the normal history DOWN peak as x1, x2, and x3, and calculates a second Mahalanobis distance by Expression 4. The magnitude of a Mahalanobis distance is proportional to the magnitude of the accuracy of pairing of peaks. Therefore, the smaller the Mahalanobis distance, the higher the pairing accuracy. Therefore, the third condition corresponds to a condition in which the accuracy of pairing of a normal history UP peak and an object DOWN peak (hereinafter, such accuracy will also be referred to as first accuracy) should be higher than the accuracy of the normal history UP peak and a normal history DOWN peak (hereinafter, such accuracy will also be referred to as second accuracy). The accuracy of pairing is the degree of certainty of whether appropriate pairing has been performed, that is, the certainty of appropriate pairing.

In FIG. 19, the Mahalanobis distance between the upper object UP peak fupuo which is the normal history UP peak and the upper object DOWN peak fdnuo which is the object DOWN peak is smaller than the Mahalanobis distance between the upper object UP peak fupuo which is a normal history UP peak and the preceding vehicle DOWN peak fdnpv which is the normal history DOWN peak. Therefore, the peak state shown in FIG. 19 satisfies the third condition.

Therefore, in a case where the positional relation of the peaks satisfies all of the first condition, the second condition, and the third condition described above, the erroneous-extraction determining unit 205 determines that the normal history UP peak has transitioned from the preceding vehicle UP peak fuppv to the upper object UP peak fupuo, that is, the signal processing unit 201 has erroneously extracted the upper object UP peak fupuo as the preceding vehicle UP peak fuppv. Also, if determining that the signal processing unit 201 has erroneously extracted the upper object UP peak fupuo as the preceding vehicle UP peak fuppv, the erroneous-extraction determining unit 205 increments the erroneous-extraction counter 206. The erroneous-extraction counter 206 is a counter for counting the number of times the signal processing unit 201 has erroneously extracted the upper object UP peak fupuo as the preceding vehicle UP peak fuppv. Determination on whether erroneous extraction has been performed, and counting of the number of times of erroneous extraction is performed for each pair including an object DOWN peak (hereinafter, such a pair will also be referred to as an object pair).

Alternatively, in a case where the positional relation of the peaks satisfies all of the first condition, the second condition, and the third condition described above, and the priority same-lane preceding-vehicle status flag of the pair of a preceding vehicle UP peak fuppv and a preceding vehicle DOWN peak fdnpv is in the ON state, the erroneous-extraction determining unit 205 may increment the erroneous-extraction counter 206. The reason is that since pairs having priority same-lane preceding-vehicle status flags set to the OFF state correspond to preceding vehicles running in the lane of the vehicle CR except for a preceding vehicle closest to the vehicle CR, even if such a pair is erroneously detected by the signal processing unit 201, it does not cause the AEBS to malfunction.

<Process of Erroneous-Extraction Determining Unit>

Figure 22:
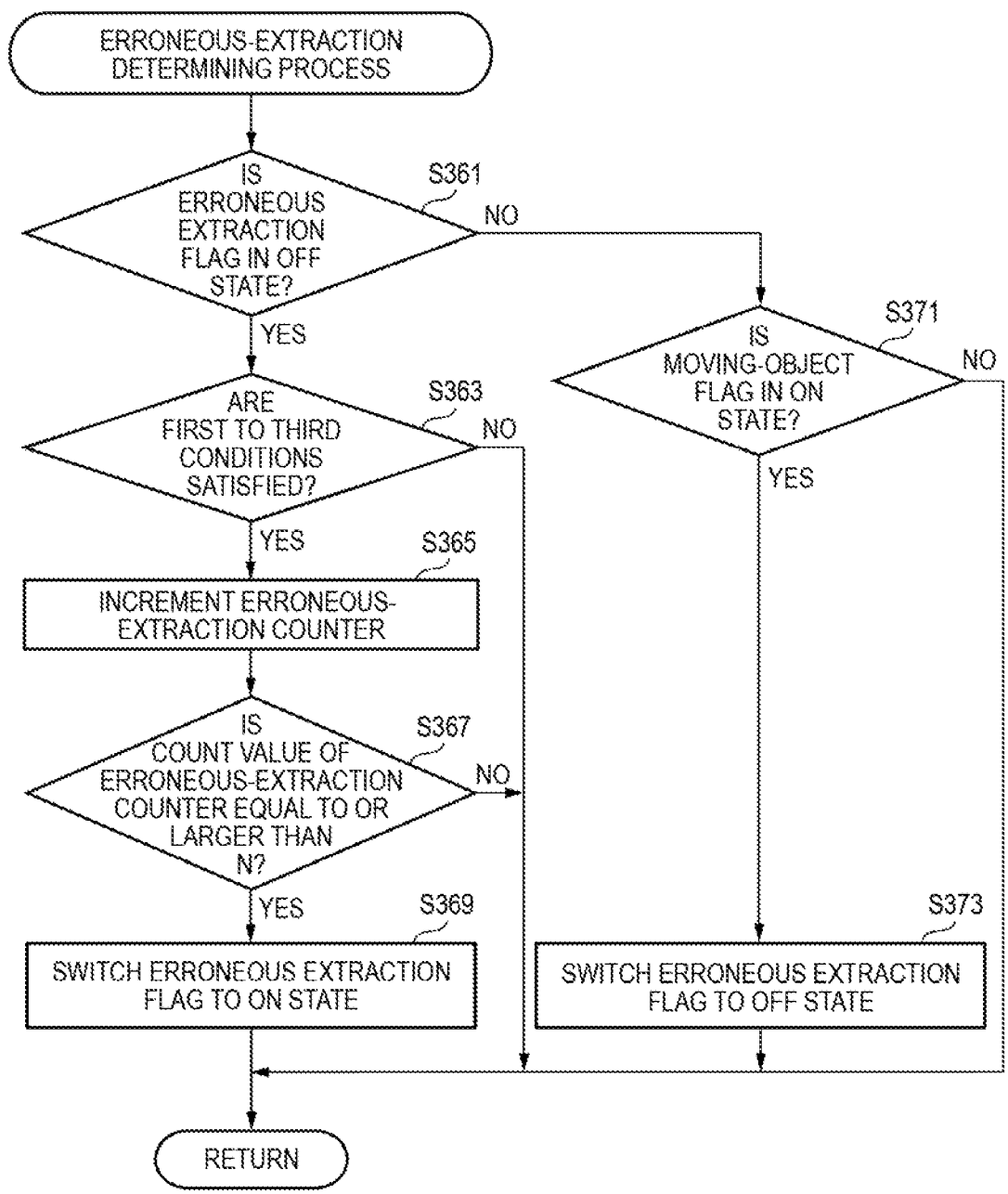
FIG. 22 is a flow chart available for explaining an example of an erroneous-extraction determining process of the first embodiment.

FIG. 22 is a flow chart available for explaining an example of an erroneous-extraction determining process of the first embodiment.

In STEP S361, the erroneous-extraction determining unit 205 determines the state of an erroneous extraction flag relative to an object pair. In a case where the erroneous extraction flag of the object pair is in an OFF state ("Yes" in STEP S361), the process proceeds to STEP S363; whereas in a case where the erroneous extraction flag of the object pair is in an ON state ("No" in STEP S361), the process proceeds to STEP S371.

In STEP S363, the erroneous-extraction determining unit 205 determines whether the positional relation of peaks satisfies all of the first condition, the second condition, and the third condition. In a case where the positional relation of the peaks satisfies all of the first condition, the second condition, and the third condition ("Yes" in STEP S363), in STEP S365, the erroneous-extraction determining unit 205 increments the erroneous-extraction counter 206. Meanwhile, in a case where the positional relation of the peaks does not satisfy any one of the first condition, the second condition, and the third condition ("No" in STEP S363), the erroneous-extraction determining unit 205 maintains the erroneous extraction flag of the object pair in the OFF state, and finishes the erroneous-extraction determining process of the current processor process section.

Subsequently, in STEP S367, the erroneous-extraction determining unit 205 determines whether the count value of the erroneous-extraction counter 206 has reached a predetermined value N (wherein N is a natural number equal to or larger than 2). In a case where the count value of the erroneous-extraction counter 206 has reached N ("Yes" in STEP S367), in STEP S369, the erroneous-extraction determining unit 205 switches the erroneous extraction flag of the object pair from the OFF state to the ON state. After the process of STEP S369, the erroneous-extraction determining unit finishes the erroneous-extraction determining process of the current processor process section. Meanwhile, in a case where the count value of the erroneous-extraction counter 206 has not reached N ("No" in STEP S367), the erroneous-extraction determining unit 205 maintains the erroneous extraction flag of the object pair, and finishes the erroneous-extraction determining process of the current processor process section.

In STEP S371, the erroneous-extraction determining unit 205 determines the state of a moving-object flag relative to the object pair. A moving-object flag of an object pair is a flag representing whether an object corresponding to the object pair is a moving object or a still object, and is set to an ON state in a case where the object corresponding to the object pair is a moving object, and is set to an OFF state in a case where the object corresponding to the object pair is a still object. In a case where the moving-object flag of the object pair is in the ON state ("Yes" in STEP S371), in STEP S373, the erroneous-extraction determining unit 205 switches the erroneous extraction flag of the object pair from the ON state to the OFF state. After the process of STEP S373, the erroneous-extraction determining unit finishes the erroneous-extraction determining process of the current processor process section. Meanwhile, in a case where the moving-object flag of the object pair is in the OFF state ("No" in STEP S371), the erroneous-extraction determining unit 205 maintains the erroneous extraction flag of the object pair in the ON state, and finishes the erroneous-extraction determining process of the current processor process section.

<Process of Unnecessary-Object Removing Unit>

The unnecessary-object removing unit 207 receives filter data items as target information items from the signal processing unit 201, and receives erroneous extraction flags of object pairs from the erroneous-extraction counter 206.

Then, the unnecessary-object removing unit 207 associates the filter data items received from the signal processing unit 201 and the erroneous extraction flags received from the erroneous-extraction counter 206, and specifies filter data items associated with erroneous extraction flags which are in the ON state. In other words, among target information items received from the signal processing unit 201, the unnecessary-object removing unit 207 specifies target information items for which the signal processing unit 201 has performed erroneous extraction is N or more times (wherein N is a natural number equal to or larger than 2).

Further, among target information items which are pairs of normal history UP peaks and normal history DOWN peaks (hereinafter, also referred to as normal history pairs), the unnecessary-object removing unit 207 specifies the moving velocities of targets corresponding to the normal history pairs, and determines whether each specified moving velocity is smaller than a threshold for still objects. Targets having moving velocities smaller than the threshold correspond to still objects, and targets having moving velocities equal to or larger than the threshold correspond to moving objects.

Subsequently, from the target information items received from the signal processing unit 201, the unnecessary-object removing unit 207 removes target information items for which the signal processing unit 201 has performed erroneous extraction is N or more times and which correspond to normal history pairs corresponding to targets having moving velocities smaller than the threshold for still objects. After the removal, the unnecessary-object removing unit 207 outputs the remaining target information items to the integrating unit 208.

As described above, according to the first embodiment, the radar device 1 includes the signal processing unit 201 and the erroneous-extraction determining unit 205. The radar device 1 transmits a transmission signal whose transmission frequency varies in the predetermined cycle, and receives the reflected signals of the transmission signal from a target, as reception signals. Also, the radar device 1 acquires peaks of frequency spectra of beat signals in UP sections and DOWN sections, and outputs target information items on the basis of the UP peaks and the DOWN peaks. The signal processing unit 201 acquires estimate UP peaks and estimate DOWN peaks, and extracts peaks existing in predetermined ranges with respect to the estimate UP peaks, as normal history UP peaks, in the UP sections and extracts peaks existing in ranges having the predetermined width with respect to the estimate DOWN peaks, as normal history DOWN peaks, in the DOWN sections. In a case where the positional relation of peaks satisfies all of the first condition, the second condition, and the third condition described above, the erroneous-extraction determining unit 205 determines that the signal processing unit 201 has erroneously extracted an upper object UP peak as a preceding vehicle UP peak. In other words, in a situation where the distance between the radar device 1 and a preceding vehicle PV decreases, if the accuracy of pairing of a normal history UP peak and an object DOWN peak is higher than the accuracy of pairing of a normal history UP peak and a normal history DOWN peak, the erroneous-extraction determining unit 205 determines that the signal processing unit 201 has erroneously extracted the upper object UP peak as a preceding vehicle UP peak.

In the above-described way, it is possible to detect that a tracking object of the radar device 1 has transitioned from a preceding vehicle to an upper object. Therefore, it is possible to detect that the radar device 1 is erroneously tracking an upper object unsuitable as a tracking object.

Also, according to the first embodiment, the radar device 1 includes the erroneous-extraction counter 206 and the unnecessary-object removing unit 207. The erroneous-extraction counter 206 counts the number of times the signal processing unit 201 has performed erroneous extraction. The unnecessary-object removing unit 207 removes target information items for which erroneous extraction has performed is N or more times and which correspond to normal history pairs corresponding to targets having moving velocities smaller than the threshold for still objects.

In this way, it is possible to prevent target information items of an upper object erroneously set as a tracking object from being output from the radar device 1. Therefore, it is possible to prevent malfunction of the AEBS. In other words, the vehicle control device 2 can perform appropriate control such as control on the brake of the vehicle, on the basis of target information items acquired from the radar device 1.

Second Embodiment

In a second embodiment, a case of resetting the erroneous-extraction counter 206 to an initial value will be described. The initial value of the erroneous-extraction counter 206 is, for example, zero (0).

<Operation of Erroneous-Extraction Determining Unit>

FIGS. 23 to 26 are views available for explaining an operation example of an erroneous-extraction determining unit of the second embodiment. In FIGS. 23 to 26, peaks shown by solid lines are normal history peaks. The erroneous-extraction determining unit 205 resets the erroneous-extraction counter 206 to the initial value in a case where peak transition satisfies any one of the following fourth to sixth conditions.

<Fourth Condition (FIG. 23)>

Figure 21:
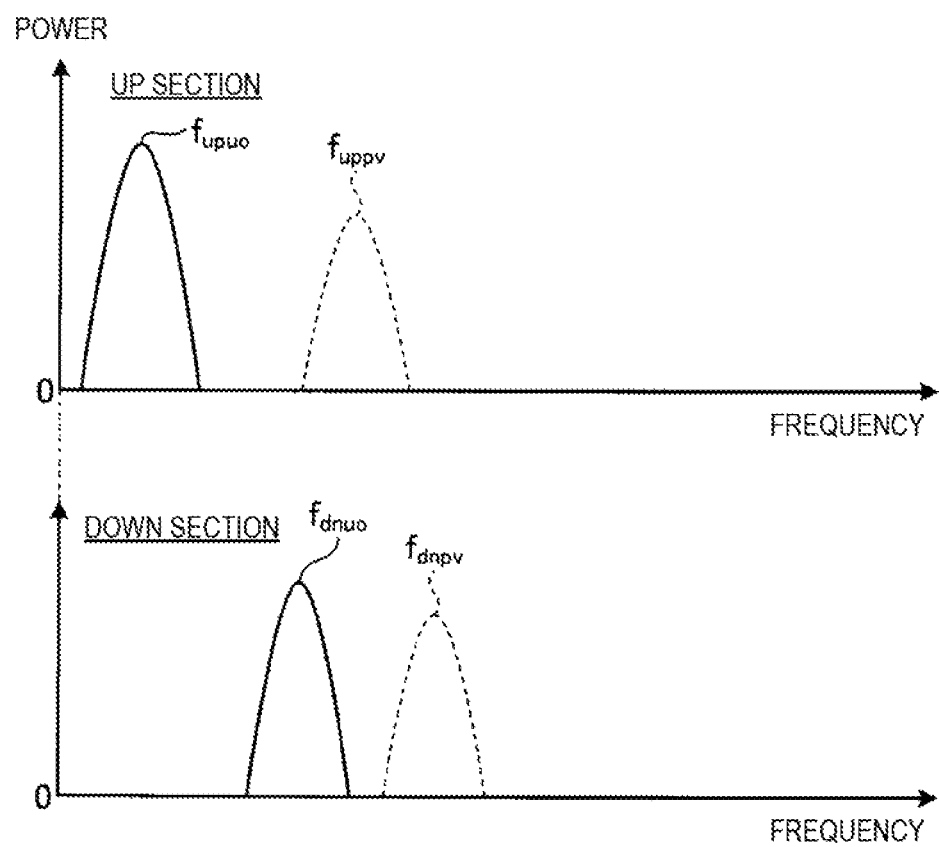
FIG. 21 is a view available for explaining the operation example of the erroneous-extraction determining unit of the first embodiment.
Figure 23:
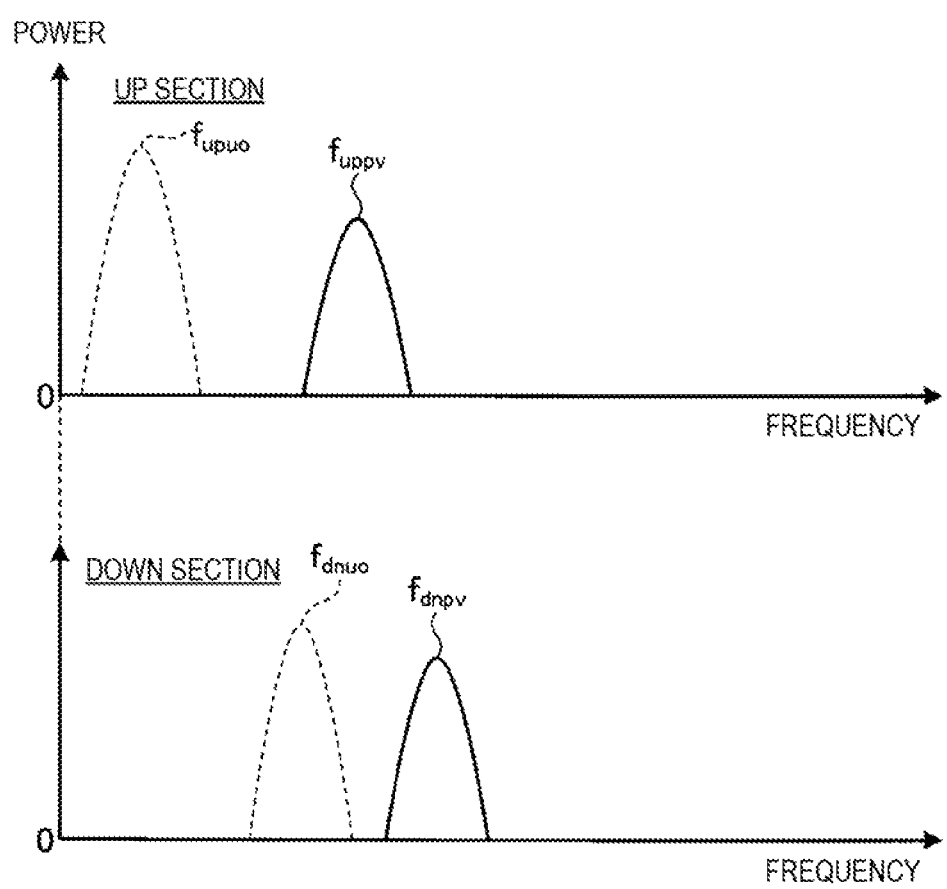
FIG. 23 is a view available for explaining an operation example of an erroneous-extraction determining unit of a second embodiment.

A state shown in FIG. 23 temporarily corresponds to a state shown in FIG. 21. As time goes on, the vehicle CR gradually approaches the upper object UO. Therefore, upper object peaks fupuo and fdnuo gradually shift in the negative direction on the frequency axis (FIGS. 18 to 21). If FIG. 21 and FIG. 23 are compared, in FIG. 21, the normal history peaks transition from the preceding vehicle peaks fuppv and fdnpv to the upper object peaks fupuo and fdnuo; whereas in FIG. 23, the normal history peaks do not transition from the preceding vehicle peaks fuppv and fdnpv to the upper object peaks fupuo and fdnuo, and the preceding vehicle peaks fuppv and fdnpv are maintained as normal history peaks. Further, in the case shown in FIG. 23, the upper object DOWN peak fdnuo specified as an object DOWN peak in FIG. 19 shifts in the negative direction on the frequency axis, and passes the preceding vehicle DOWN peak fdnpv which is the normal history DOWN peak. Therefore, in a case where the object DOWN peak has passed the normal history DOWN peak on the frequency axis, it is possible to determine that the normal history peak has not transitioned from the preceding vehicle peak to the upper object peak. Further, in a case where the fourth condition in which an object DOWN peak should has passed a normal history DOWN peak on the frequency axis is satisfied, the erroneous-extraction determining unit 205 resets the erroneous-extraction counter 206 to the initial value.

<Fifth Condition (FIGS. 24 and 25)>

Figure 24:
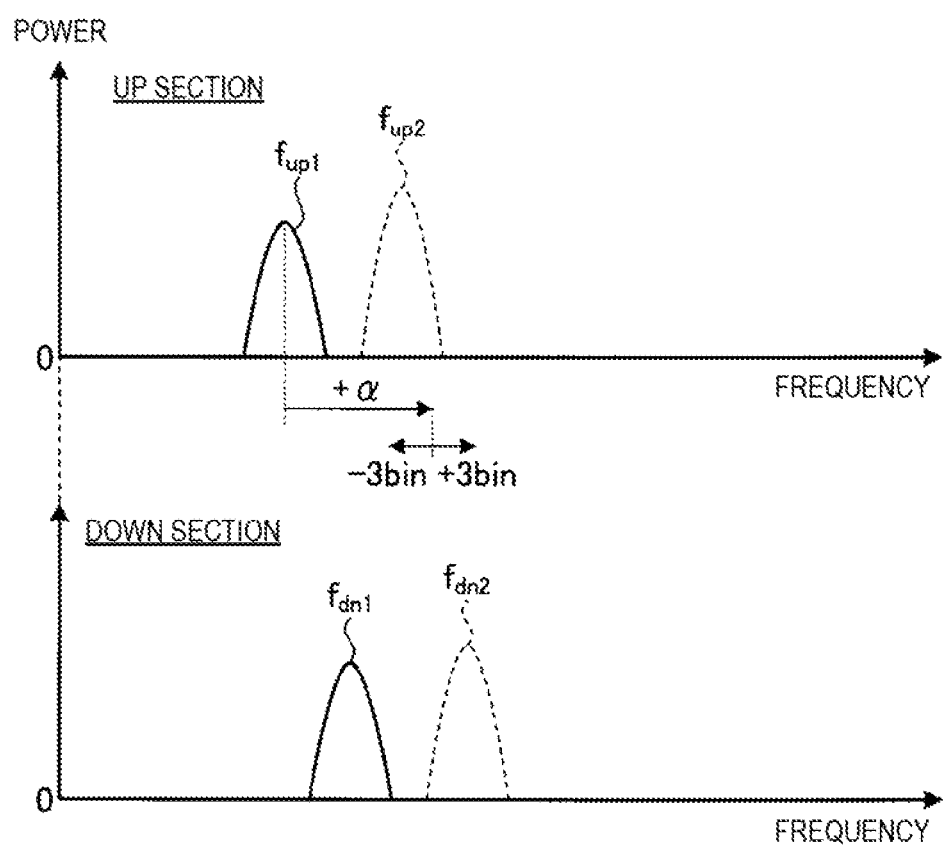
FIG. 24 is a view available for explaining the operation example of the erroneous-extraction determining unit of the second embodiment.
Figure 25:
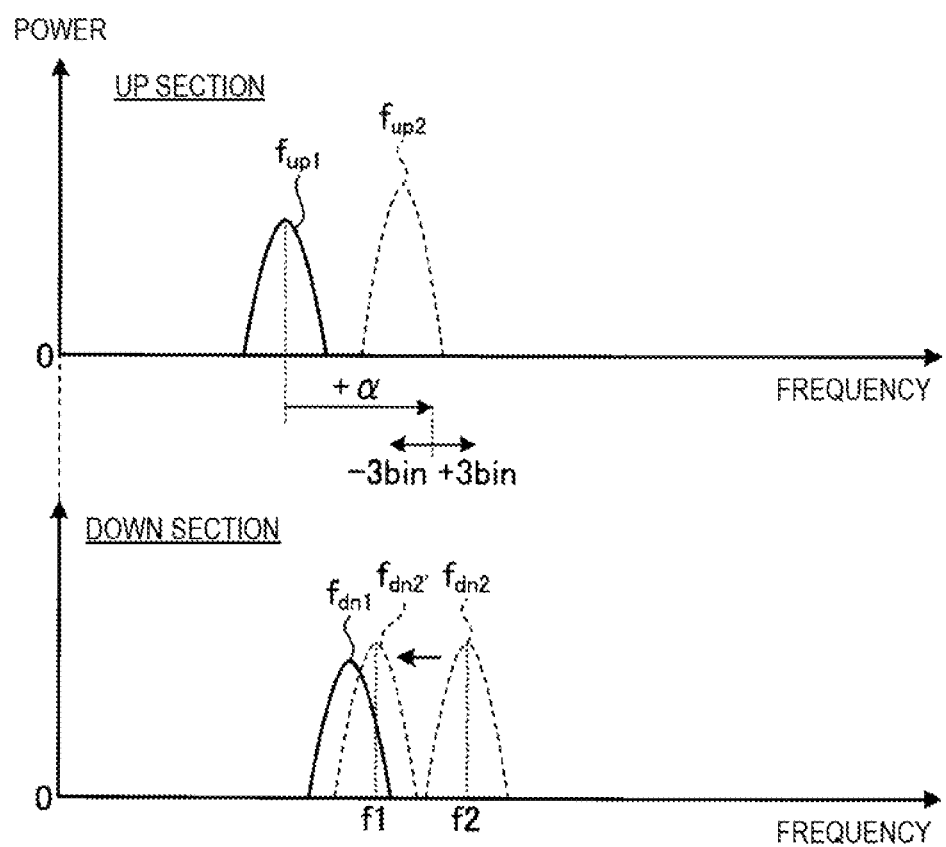
FIG. 25 is a view available for explaining the operation example of the erroneous-extraction determining unit of the second embodiment.

FIG. 24 shows a state during a previous determination, and FIG. 25 shows a state during a current determination.

For example, in a case where a preceding vehicle PV is a truck, since the overall length of the truck is long, a transmission signal may be reflected from a plurality of areas on the truck. In this case, the radar device 1 receives a plurality of reception signals from the same object, that is, one truck. For example, a transmission signal is reflected from a position P1 which is the position of a rear bumper installed on the rear end of the truck, and is input as a reception signal R1 to the radar device, and the transmission signal is reflected from a position P2 which is the position of a side mirror installed in the vicinity of a driver's seat of the front part of the truck, and is input as a reception signal R2 to the radar device. If the reception signal R1 and the reception signal R2 are received from the same object, that is, one truck, in the signal processing unit 201, as shown in FIG. 24, with respect to one truck, two UP peaks fup1 and fup2 and two DOWN peaks fdn1 and fdn2 are derived.

In the state shown in FIG. 24, the erroneous-extraction determining unit 205 specifies the DOWN peak fdn2 as an object DOWN peak. However, in the erroneous-extraction determining unit 205, whether the specified object DOWN peak is a preceding vehicle peak or an upper object peak is unclear. Also, since the vehicle CR gradually approaches the upper object UO as time goes on, if the specified object DOWN peak is an upper object peak, the object DOWN peak gradually shifts in the negative direction on the frequency axis as time goes on.

Further, as shown in FIG. 25, on the basis of the relative velocity to the upper object UO, the erroneous-extraction determining unit 205 estimates the shifted object DOWN peak (a DOWN peak fdn2'), that is, the frequency position f1 of an object DOWN peak in the current determination, from the object DOWN peak (the DOWN peak fdn2) specified in the previous determination. Also, the UP peaks fup1 and fup2 and the DOWN peaks fdn1 and fdn2 are peaks corresponding to one truck. Therefore, even if time goes on, the interval between the UP peak fup1 and the UP peak fup2 is constant, and the interval between the DOWN peak fdn1 and the DOWN peak fdn2 is constant. Therefore, even in the current determination, similarly in the previous determination, the erroneous-extraction determining unit 205 specifies the DOWN peak fdn2 as an object DOWN peak (FIG. 25). Also, the erroneous-extraction determining unit 205 specifies the frequency position f2 of the object DOWN peak (the DOWN peak fdn2) specified in the current determination.

Then, if the fifth condition in which the estimated frequency position f1 should be different from the frequency position f2 of the object DOWN peak actually specified in the current determination is satisfied, the erroneous-extraction determining unit 205 determines that there is no possibility that the signal processing unit 201 will erroneously extract an upper object UP peak as a preceding vehicle UP peak, and resets the erroneous-extraction counter 206 to the initial value.

<Sixth Condition (FIG. 26)>

Figure 26:
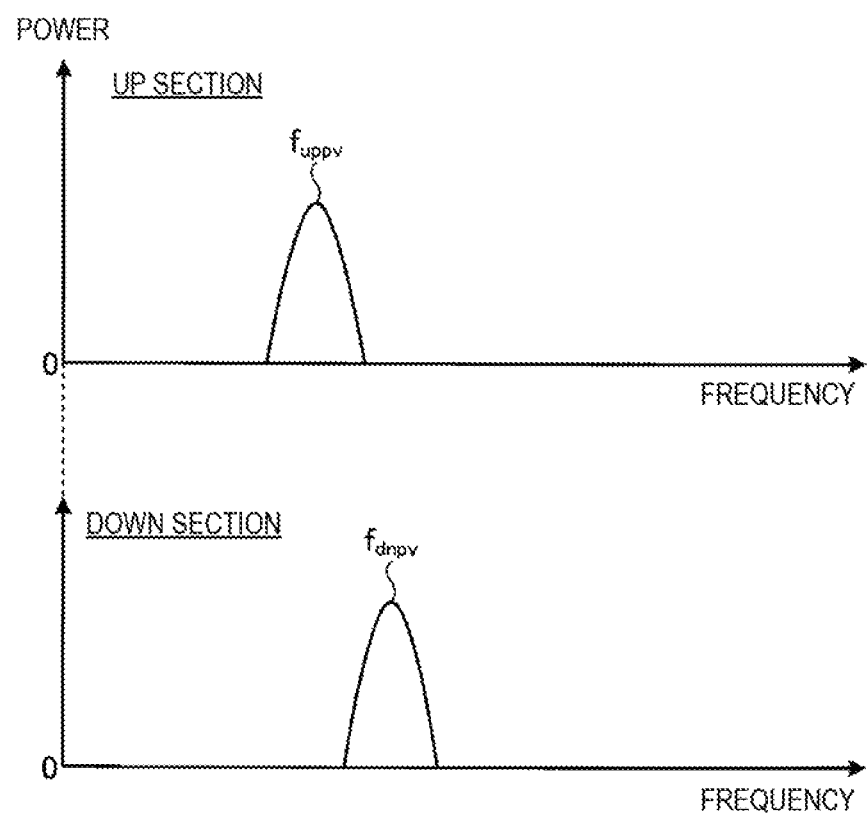
FIG. 26 is a view available for explaining the operation example of the erroneous-extraction determining unit of the second embodiment.

FIG. 26 shows a state after the state shown in FIG. 19 in terms of time. If FIG. 19 and FIG. 26 are compared, in FIG. 26, the upper object DOWN peak fdnuo specified as an object DOWN peak in FIG. 19 does not exist any more. In the case where there is no object DOWN peak, there is no possibility that the normal history peak will transition from the preceding vehicle peak to the upper object peak. Therefore, in a case where the sixth condition in which any object DOWN peak should not exist for a predetermined time is satisfied, the erroneous-extraction determining unit 205 resets the erroneous-extraction counter 206 to the initial value.

As described above, according to the second embodiment, in a case where an object DOWN peak has passed a normal history DOWN peak, the erroneous-extraction determining unit 205 resets the erroneous-extraction counter 206 to the initial value.

Also, according to the second embodiment, the erroneous-extraction determining unit 205 estimates the frequency position f1 of an object DOWN peak in the current determination, from an object DOWN peak specified in the previous determination. In a case where the estimated frequency position f1 is different from the frequency position f2 of an object DOWN peak actually specified in the current determination, the erroneous-extraction determining unit resets the erroneous-extraction counter 206 to the initial value.

Also, according to the second embodiment, in a case where any object DOWN peak does not exist for the predetermined time, the erroneous-extraction determining unit 205 resets the erroneous-extraction counter 206 to the initial value.

As described above, in a case where any one of the fourth condition, the fifth condition, and the sixth condition is satisfied, the erroneous-extraction counter 206 is reset. Therefore, it is possible to prevent malfunction of the erroneous-extraction determining unit 205.

Other Embodiments

The individual processes which are performed by the processor 17 may be implemented by executing a program corresponding to the individual processes in the processor 17. For example, the programs corresponding to the above-described individual processes may be stored in the memory 18, such that the processor 17 can read out the individual programs from the memory 18 and execute them. Also, the individual programs do not necessarily need to be stored in the memory 18 in advance. For example, the individual programs may be recorded in a portable recording medium connectable to the radar device 1, such as a magnetic disk, an optical disk, an IC card, or a memory card, in advance, such that the processor 17 can read out the individual programs from the recording medium and execute them. Also, for example, the individual programs may be stored in a computer, a server, or the like connectable to the radar device 1 through the Internet, a LAN, a wireless LAN, or the like, wirelessly or by a cable, such that the individual programs can be read into the processor 17 and be executed in the processor.

What is claimed is:

1. A radar device configured to:
    transmit a transmission signal in which a transmission frequency varies in a predetermined cycle;
    receive the transmission signal reflected from an object, as a reception signal;
    acquire peaks of frequency spectra of signals representing frequency differences between the transmission frequency and a reception frequency of the reception signal, in a rising section of the transmission frequency and a falling section of the transmission frequency; and
    output target information regarding the object on the basis of a first peak which is a peak of the rising section and a second peak which is a peak of the falling section, the radar device comprising:
    at least one hardware processor programmed to:
        acquire a first estimate peak which is a peak estimated as the first peak in the rising section;
        acquire a second estimate peak which is a peak estimated as the second peak in the falling section;
        extract a peak existing in a predetermined range relative to the first estimate peak in the rising section, as a first history peak;
        extract a peak existing in a predetermined range relative to the second estimate peak in the falling section, as a second history peak; and
        the first peak corresponding to a still object has been erroneously extracted as the first peak corresponding to a moving object, in response to determining that an accuracy of pairing of the first history peak and a second object peak which is the second peak existing in a predetermined range apart from the first history peak by a predetermined distance is larger than an accuracy of pairing of the first history peak and the second history peak in a situation where a distance between the radar device and the moving object decreases.

2. The radar device according to claim 1, wherein the at least one hardware processor is programmed to:
    count the number of times of erroneous extraction which is the number of times the erroneous extraction has occurred; and
    remove the target information for which the number of times of the erroneous extraction is equal to or larger than a predetermined value and for which a moving velocity of the object corresponding to a pair of the first history peak and the second history peak is smaller than a threshold corresponding to the still object.

3. The radar device according to claim 2, wherein the at least one hardware processor is programmed to
    in a case where the second object peak moves on a frequency axis and passes the second history peak, reset the counter.

4. The radar device according to claim 2, wherein the at least one hardware processor is programmed to:
    estimate a first position which is a frequency position of the second object peak of a current determination, from the second object peak specified in a previous determination; and
    if the estimated first position is different from a second position which is a frequency position of the second object peak actually specified in the current determination, reset the counter.

5. The radar device according to claim 2, wherein the at least one hardware processor is programmed to
    in a case where the second object peak does not exist for a predetermined time, reset the counter.

6. A peak processing method in a radar device configured to:
    transmit a transmission signal in which a transmission frequency varies in a predetermined cycle;
    receive the transmission signal reflected from an object, as a reception signal;
    acquire peaks of frequency spectra of signals representing frequency differences between the transmission frequency and a reception frequency of the reception signal, in a rising section of the transmission frequency and a falling section of the transmission frequency; and output target information regarding the object on the basis of a first peak which is a peak of the rising section and a second peak which is a peak of the falling section, the peak processing method comprising:

acquiring a first estimate peak which is a peak estimated as the first peak in the rising section;

acquiring a second estimate peak which is a peak estimated as the second peak in the falling section;

extracting a peak existing in a predetermined range relative to the first estimate peak in the rising section, as a first history pea; and extracting a peak existing in a predetermined range relative to the second estimate peak in the falling section, as a second history peak; and determining that the first peak corresponding to a still object has been erroneously extracted as the first peak corresponding to a moving object, in response to determining that an accuracy of pairing of the first history peak and a second object peak which is the second peak existing in a predetermined range apart from the first history peak by a predetermined distance is larger than an accuracy of pairing of the first history peak and the second history peak, in a situation where a distance between the radar device and the moving object decreases.

* * * * *